United States Patent [19]
Takechi et al.

[11] Patent Number: 5,323,951
[45] Date of Patent: Jun. 28, 1994

[54] METHOD OF JOINING STEEL SHEET BARS IN HOT ROLLING AND A CONTINUOUS HOT ROLLING METHOD

[75] Inventors: Toshisada Takechi; Masanori Ebihara; Fujio Aoki; Kunio Yoshida; Naoki Hatano; Hiroshi Sekiya; Toshiaki Amagasa; Kuniaki Sato; Takashi Kawase; Hideo Takekawa; Norio Takashima; Takashi Ishikawa; Masanori Kitahama, all of Chiba, Japan

[73] Assignee: Kawasaki Steel Corporation, Kobe, Japan

[21] Appl. No.: 844,670

[22] PCT Filed: Aug. 1, 1991

[86] PCT No.: PCT/JP91/01031

§ 371 Date: Apr. 2, 1992

§ 102(e) Date: Apr. 2, 1992

[87] PCT Pub. No.: WO92/02315

PCT Pub. Date: Feb. 20, 1992

[30] Foreign Application Priority Data

| Aug. 2, 1990 | [JP] | Japan | 2-203992 |
| Aug. 2, 1990 | [JP] | Japan | 2-203993 |
| Aug. 2, 1990 | [JP] | Japan | 2-203996 |
| Aug. 2, 1990 | [JP] | Japan | 2-203999 |
| Mar. 18, 1991 | [JP] | Japan | 3-077174 |
| Mar. 18, 1991 | [JP] | Japan | 3-077177 |
| Mar. 18, 1991 | [JP] | Japan | 3-077178 |
| Mar. 18, 1991 | [JP] | Japan | 3-077181 |
| Mar. 18, 1991 | [JP] | Japan | 3-204000 |
| Apr. 23, 1991 | [JP] | Japan | 3-117935 |

[51] Int. Cl.⁵ .............................. B23K 20/04
[52] U.S. Cl. .................... 228/102; 228/158; 228/170; 228/265; 72/202; 72/203; 219/617; 219/645

[58] Field of Search ............. 228/102, 158, 164, 170, 228/173.1, 173.5, 236, 239, 240; 72/202, 203; 219/10.53, 10.61 R, 10.77

[56] References Cited

U.S. PATENT DOCUMENTS

| 4,706,871 | 11/1987 | Kajiwara et al. | 228/158 |
| 5,121,873 | 6/1992 | Sekiya et al. | 228/170 |
| 5,172,846 | 12/1992 | Hayashi et al. | 228/5.7 |

FOREIGN PATENT DOCUMENTS

| 0135133 | 3/1985 | European Pat. Off. |
| 0460655 | 11/1991 | European Pat. Off. |
| 59-130603 | 7/1984 | Japan . |
| 60-40601 | 3/1985 | Japan . |
| 213379 | 10/1985 | Japan | 228/158 |
| 213382 | 10/1985 | Japan | 228/158 |

OTHER PUBLICATIONS

Patent Abstracts of Japan, vol. 12, No. 321 (M-736) (3168), Aug. 31, 1988.
Database WPI, Section Ch, Week 7628, Derwent Publications Ltd., London, Great Britain, Class M21, AN 76-52785X(28).

Primary Examiner—Samuel M. Heinrich
Attorney, Agent, or Firm—Dvorak and Traub

[57] ABSTRACT

In this invention, a back end portion of a preceding sheet bar and a front end of a succeeding sheet bar are cut in a transfer line at an entrance side of a finish rolling mill so that at least both side edge regions of these sheet bars are contacted with each other at a butted contact state thereof and a gap is formed between both end portions and then portions to be joined in the preceding and succeeding sheet bars are locally heated and pushed to join them while gradually enlarging a joining area, whereby the required time is largely reduced as compared with the conventional technique and also it is attempted to miniaturize the heating apparatus and shorten the length of the apparatus.

17 Claims, 41 Drawing Sheets

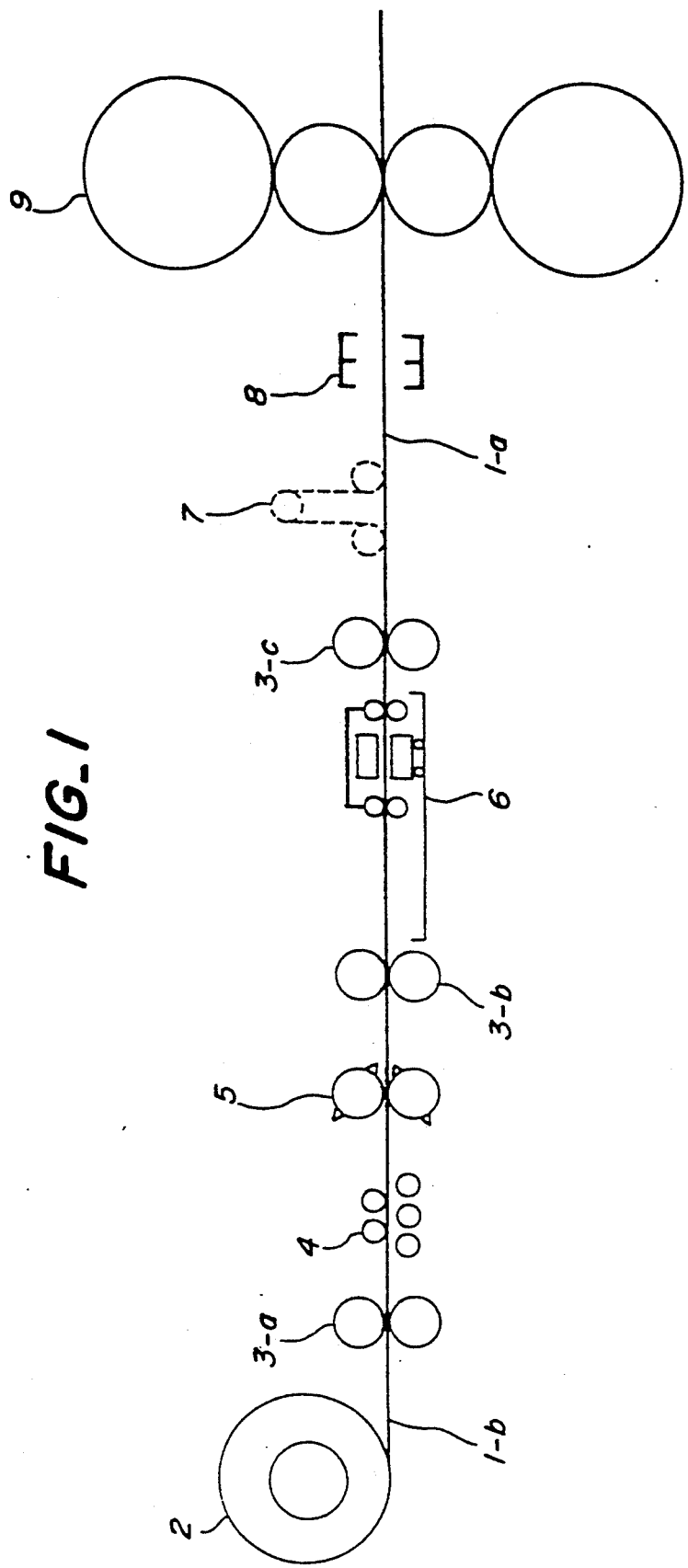

FIG_2(a)
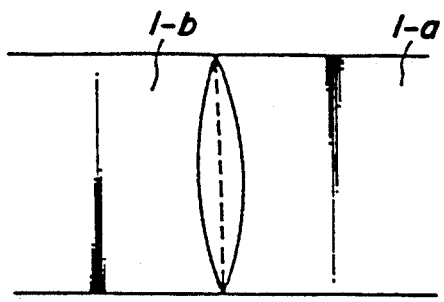
FIG_2(b)
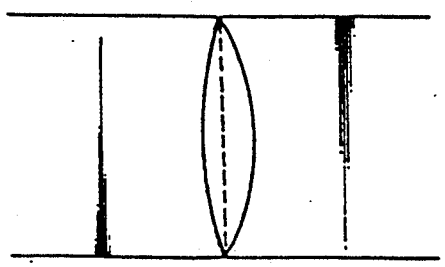
FIG_2(c)
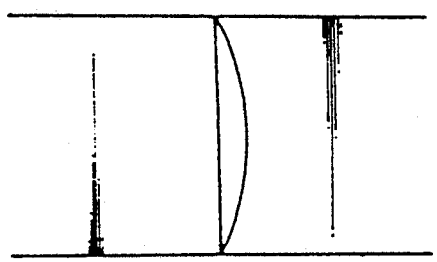
FIG_2(d)
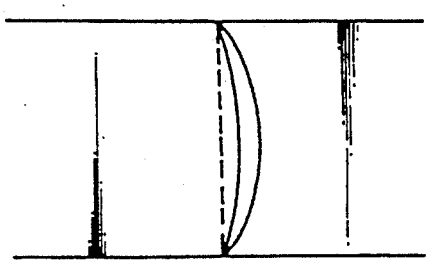
FIG_2(e)
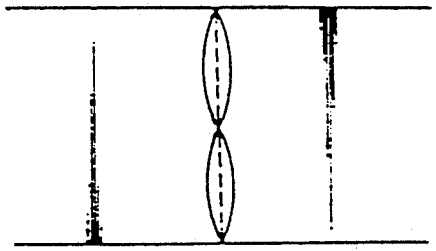
FIG_2(f)
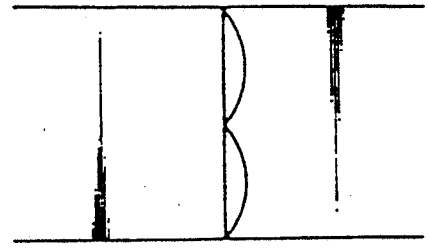
FIG_2(g)
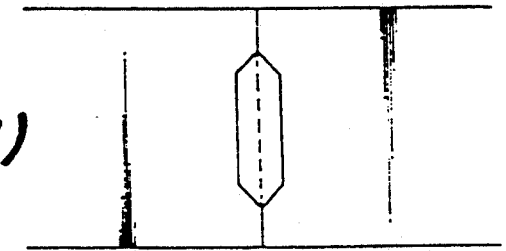

FIG_3
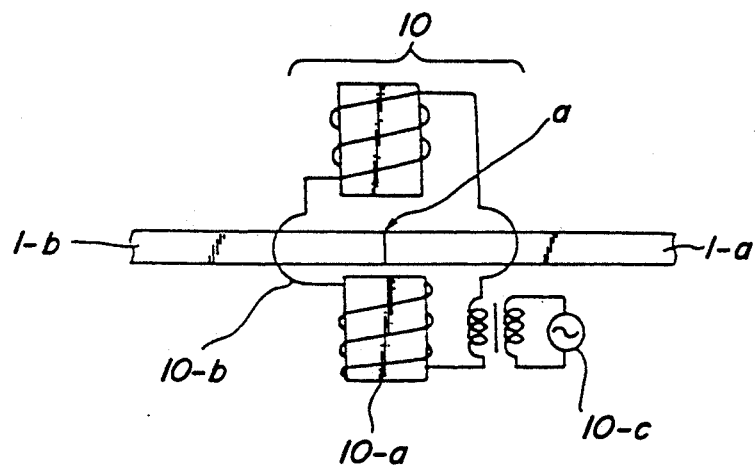

FIG_4(a)
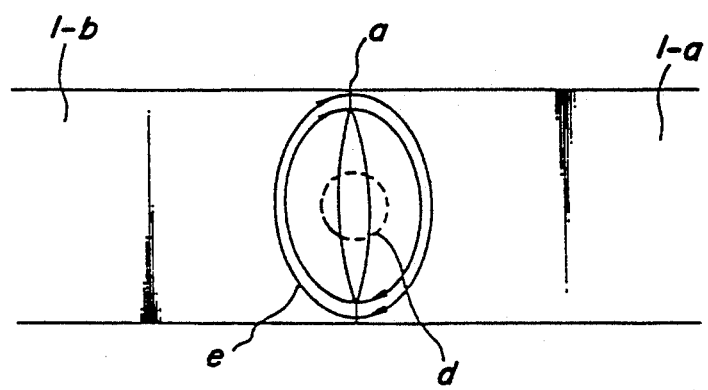
FIG_4(b)
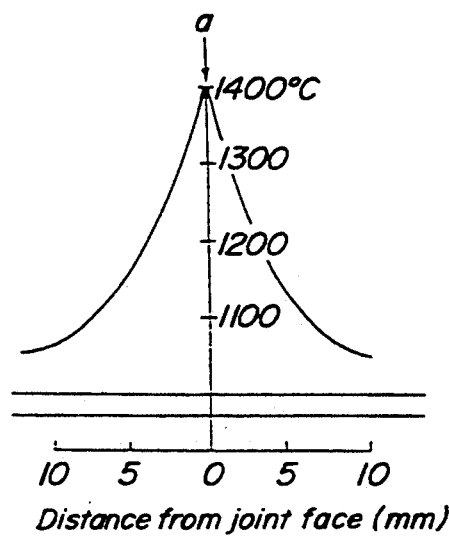
Distance from joint face (mm)

FIG_5
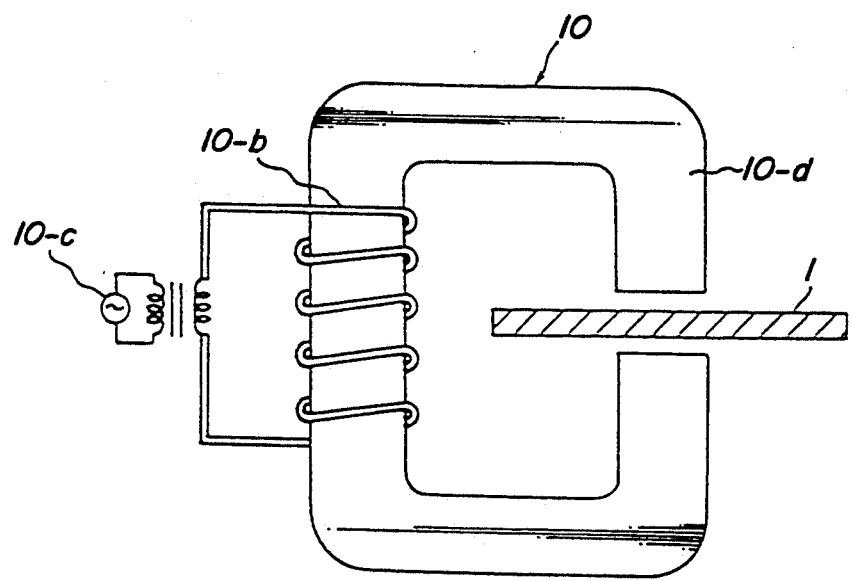

FIG_6(a)
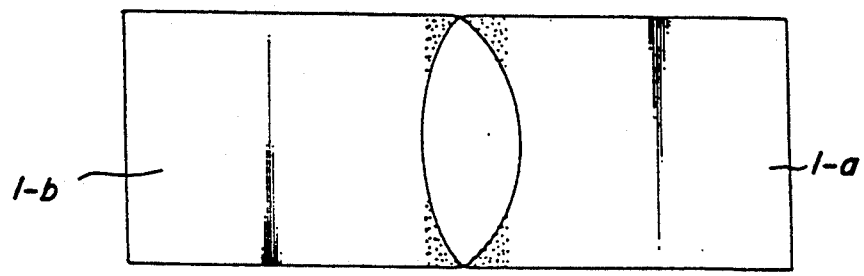
FIG_6(b)
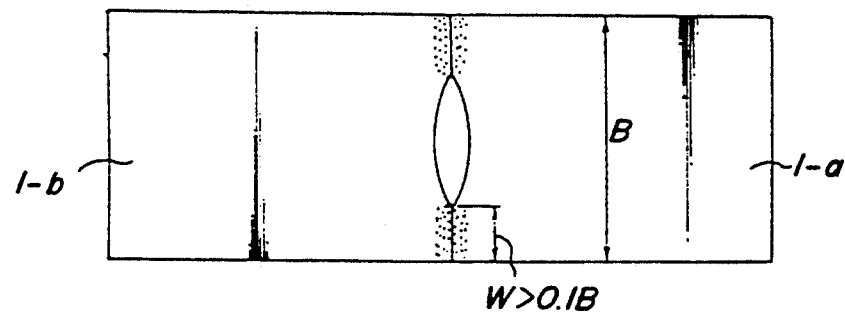

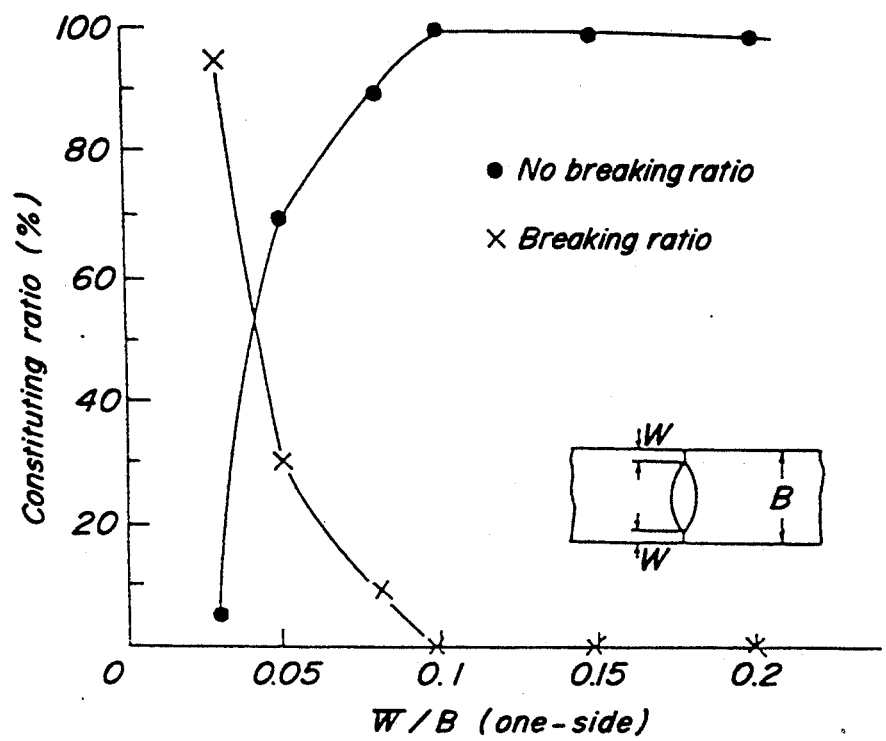
FIG_7

FIG_8
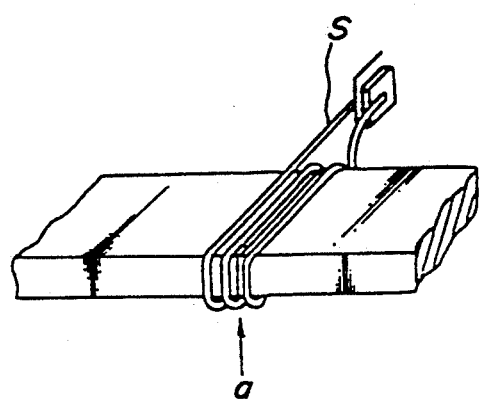
FIG_9(a)
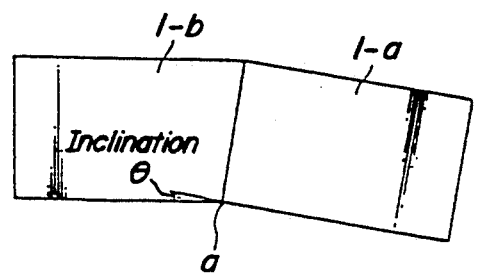
FIG_9(b)
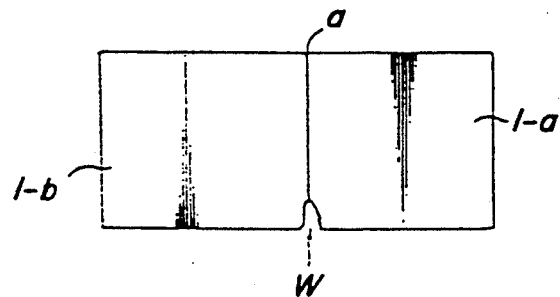

FIG_10
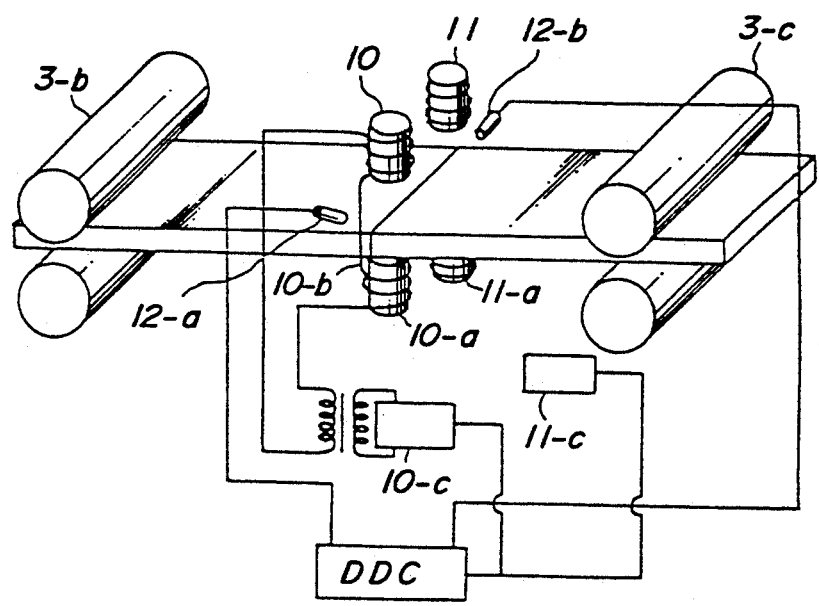

FIG_11(a)
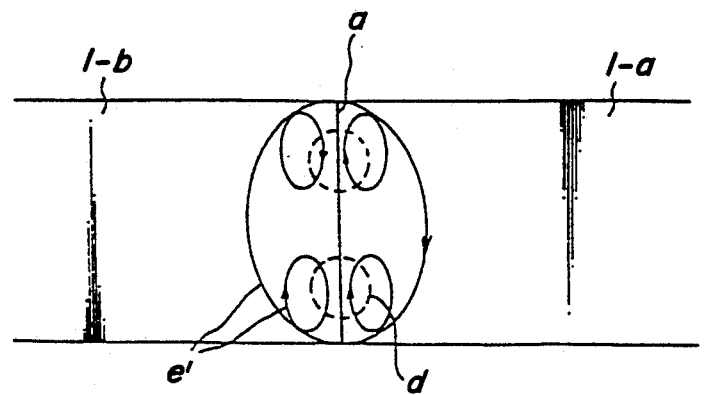
FIG_11(b)
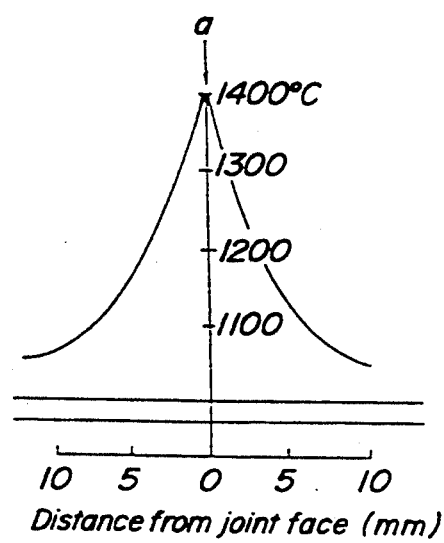
Distance from joint face (mm)

FIG_13

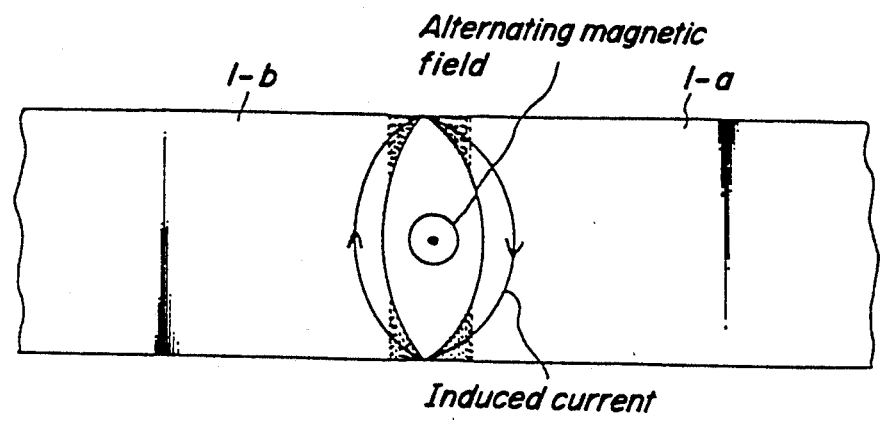
FIG_15
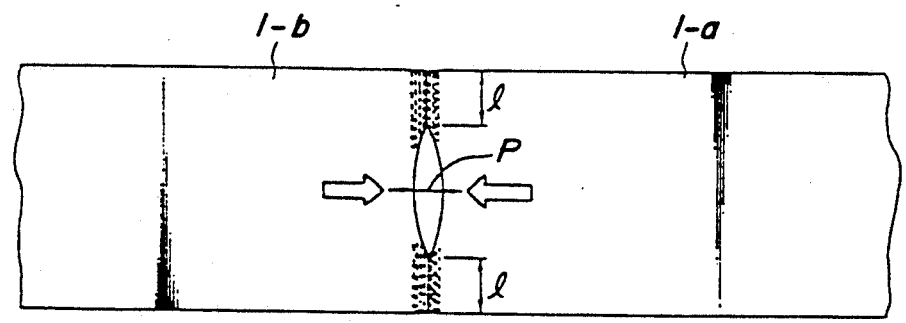
FIG_16

FIG_18(a)
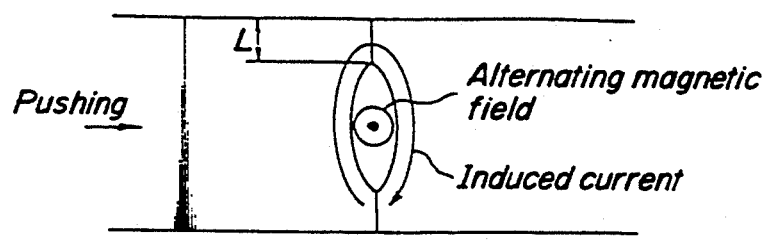
FIG_18(b)
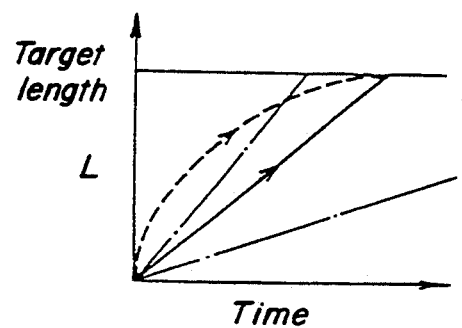

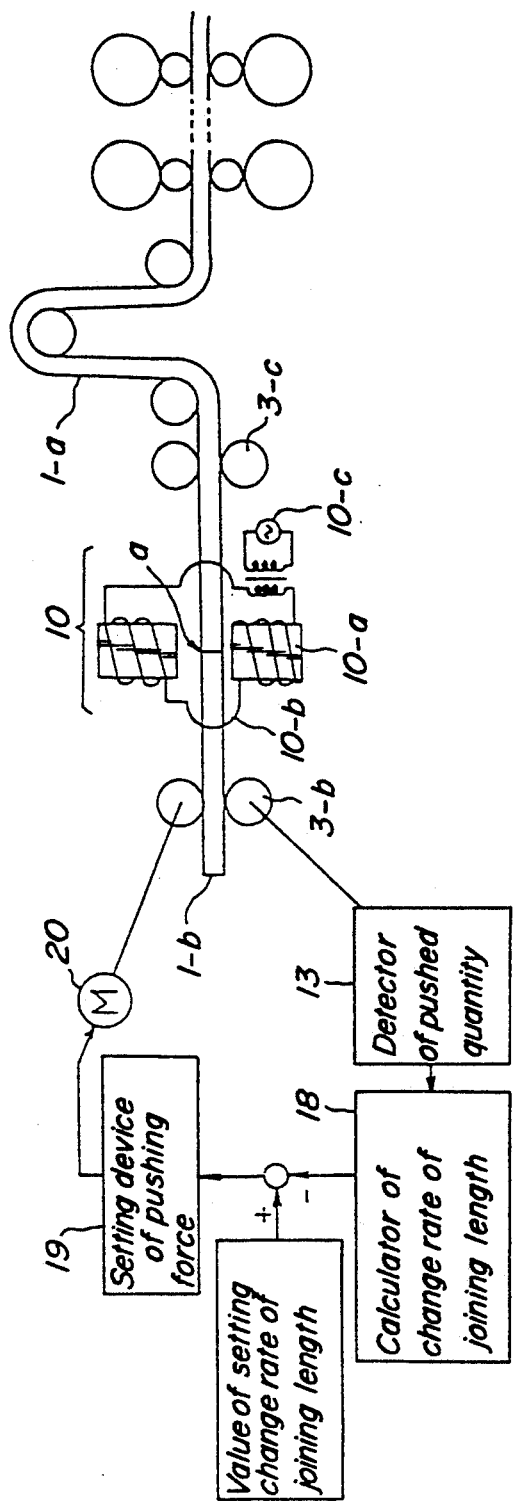

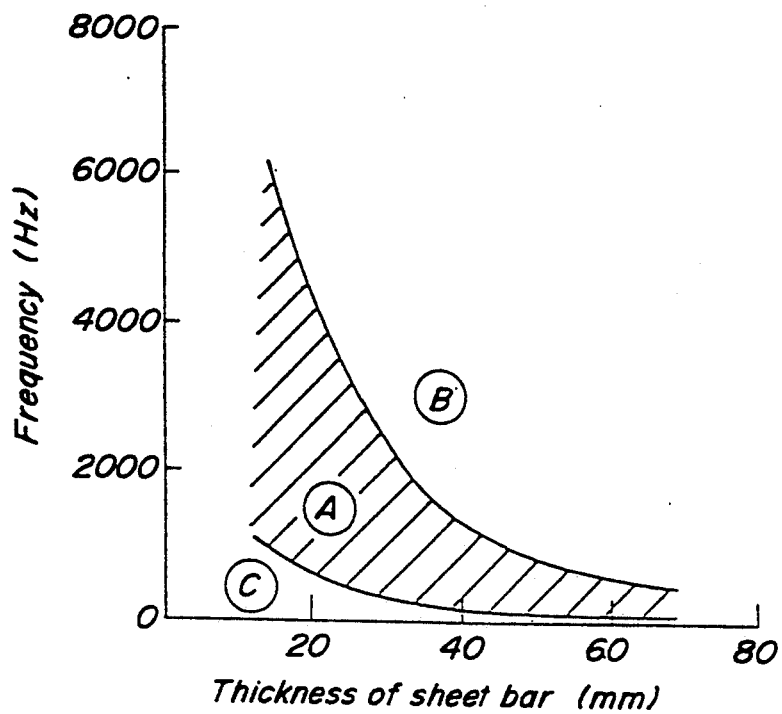
FIG_20
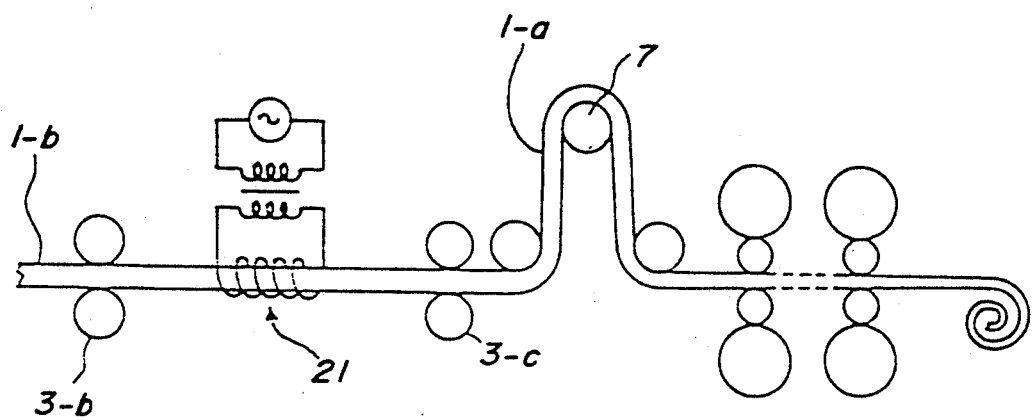
FIG_21

FIG_24
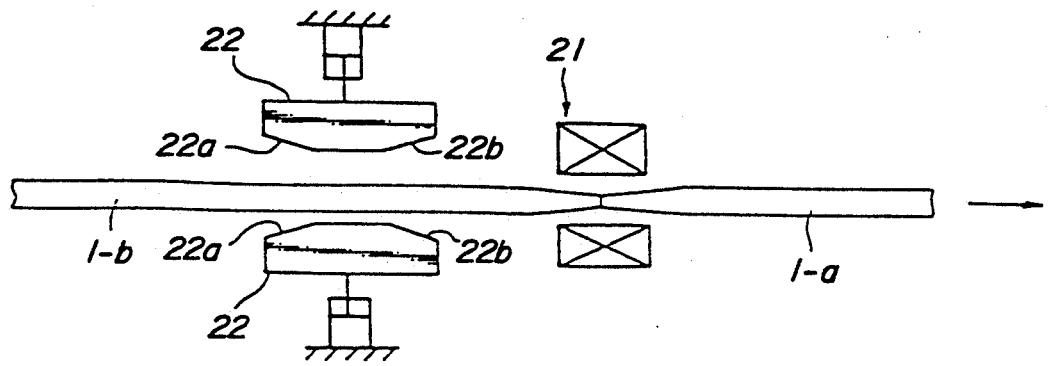
FIG_25
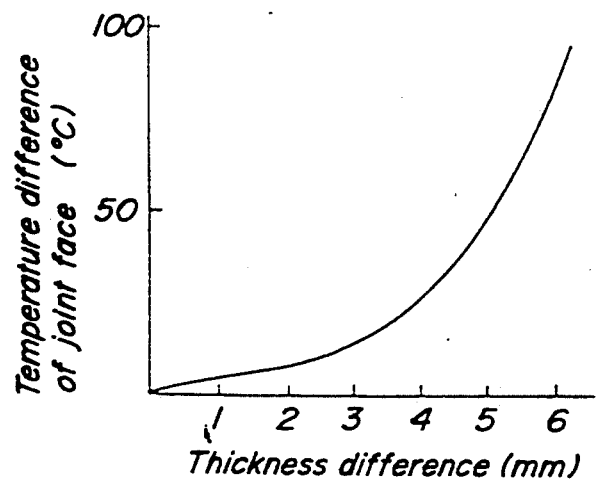

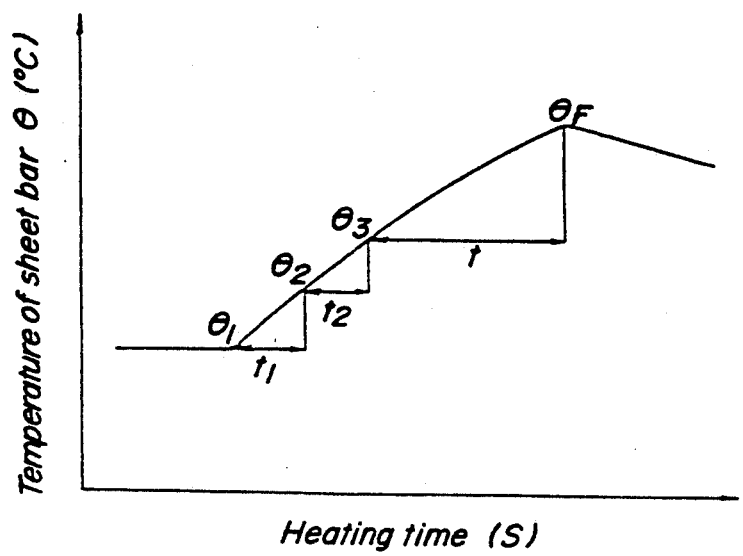
FIG_26
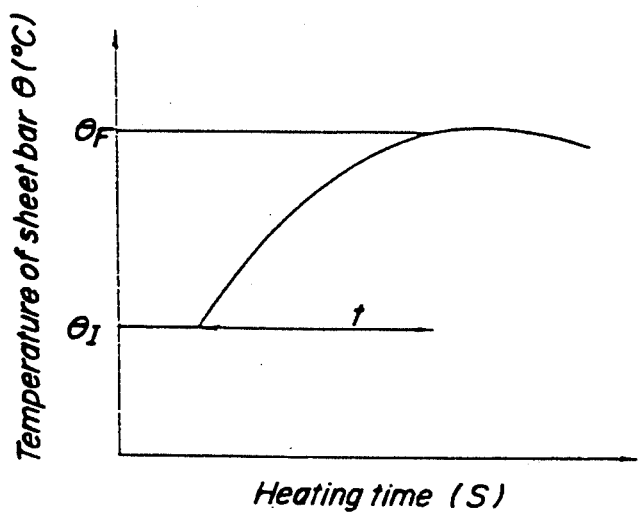
FIG_27

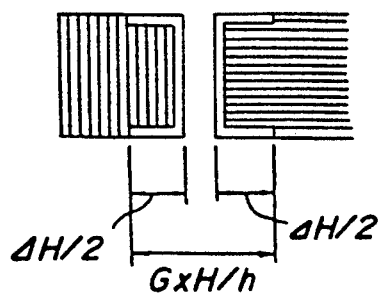
FIG_30(a)
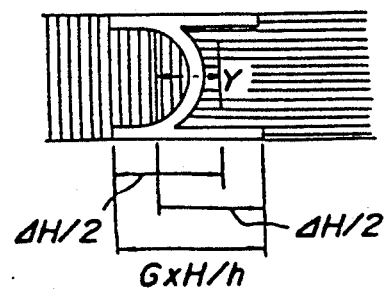
FIG_30(b)
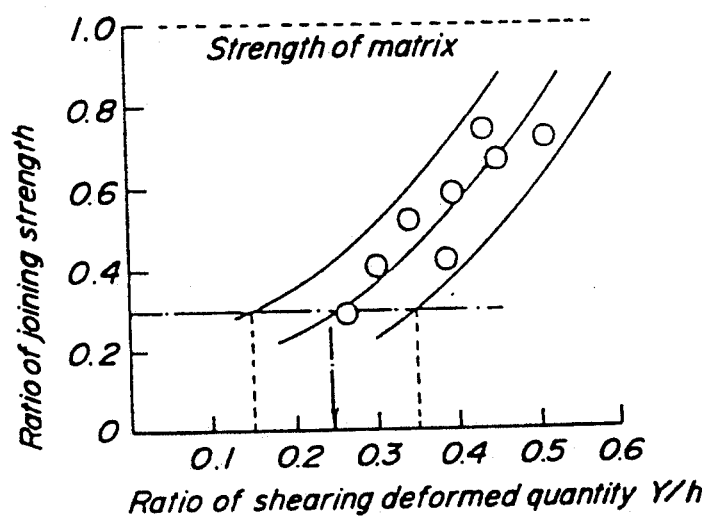
FIG_31

FIG_32
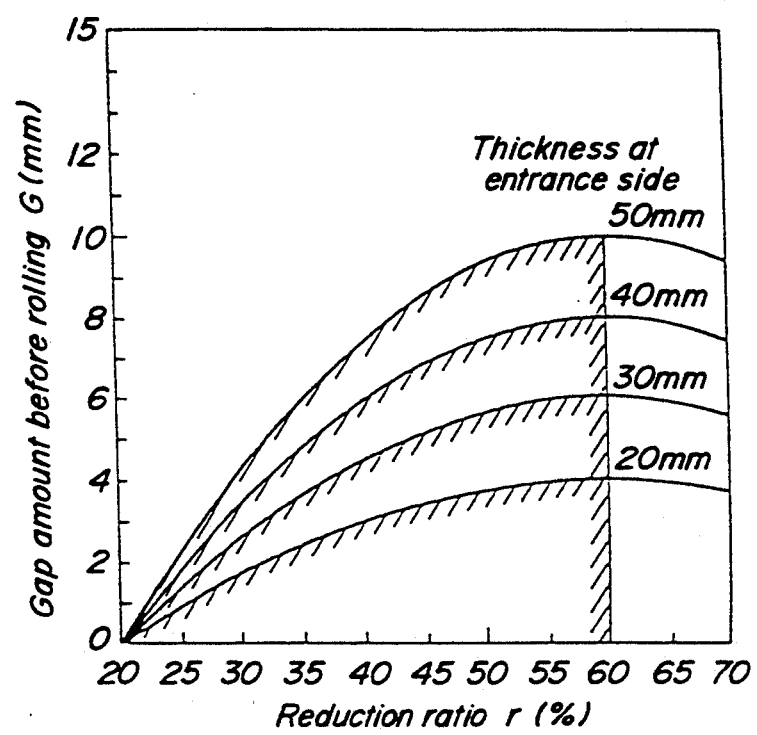

FIG_33
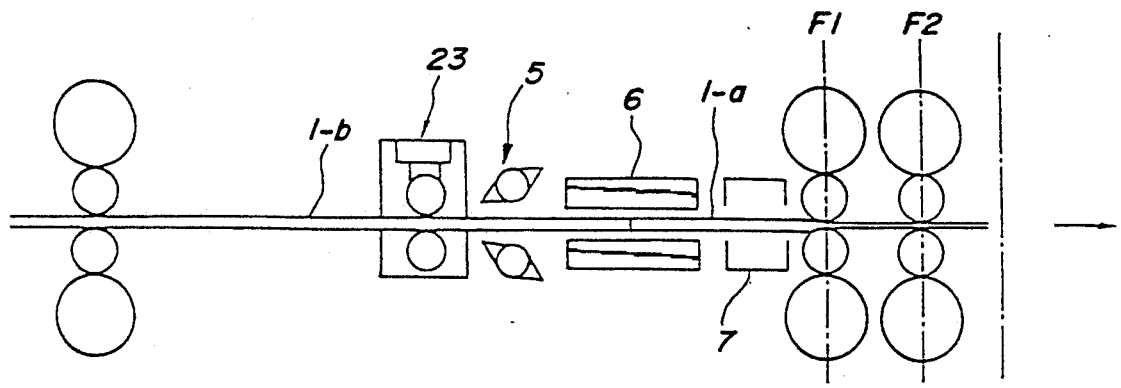

FIG_34 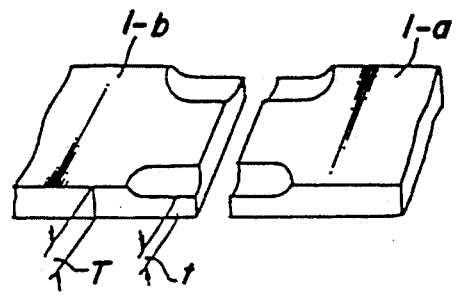
FIG_35 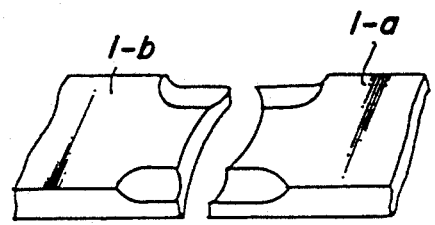
FIG_36 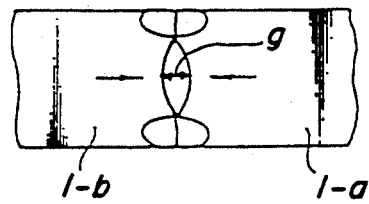
FIG_37 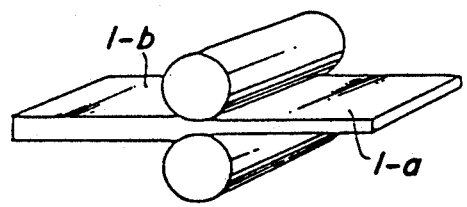
FIG_38 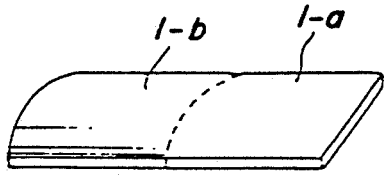

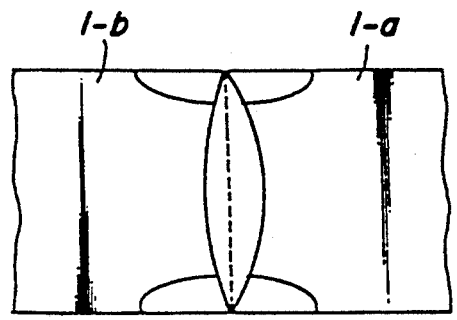
FIG_39
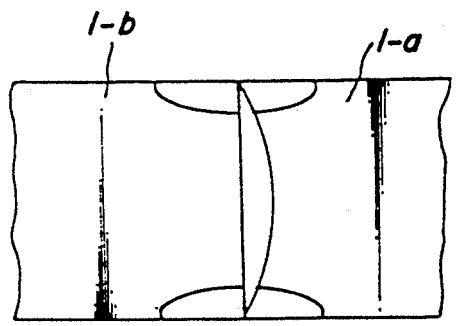
FIG_40
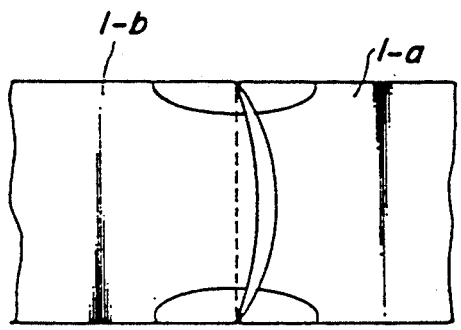
FIG_41

FIG_42
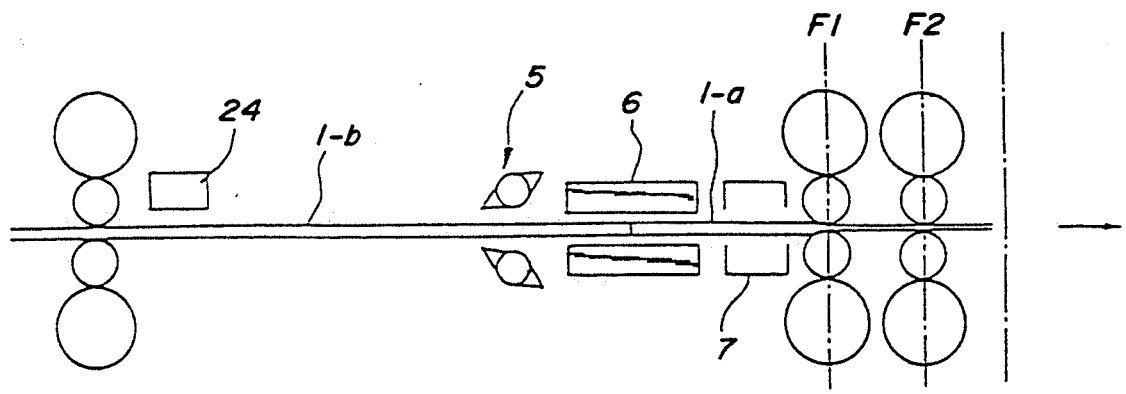

FIG_43
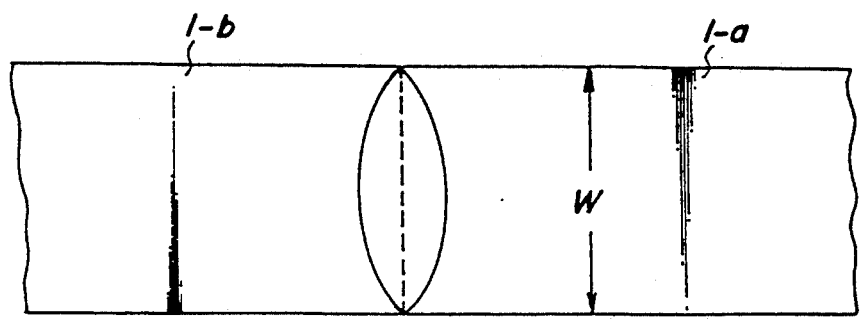
FIG_44
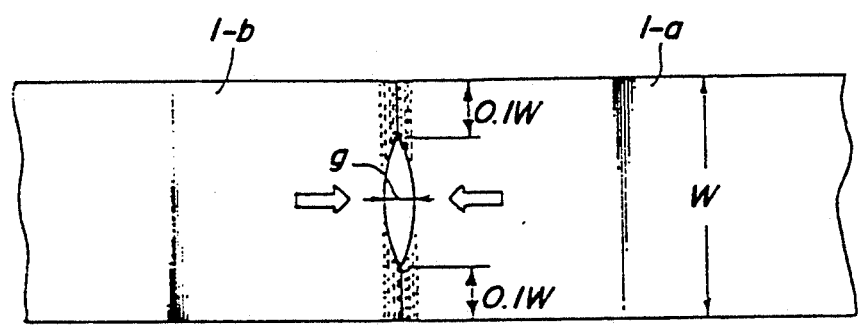

FIG_45
FIG_46
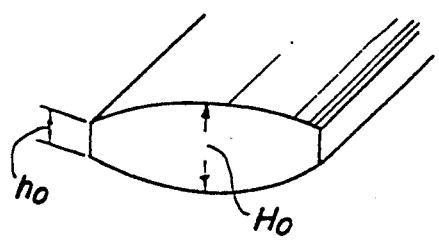
FIG_47
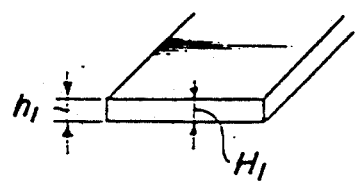

FIG_48
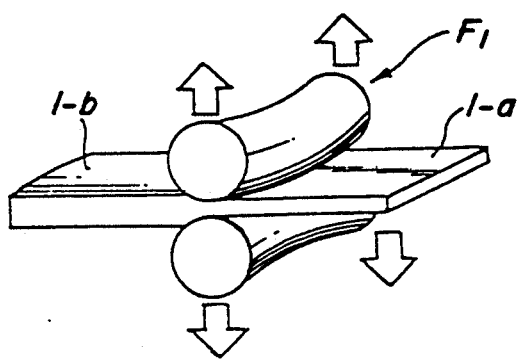
FIG_49
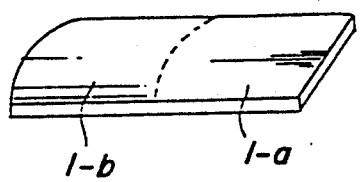

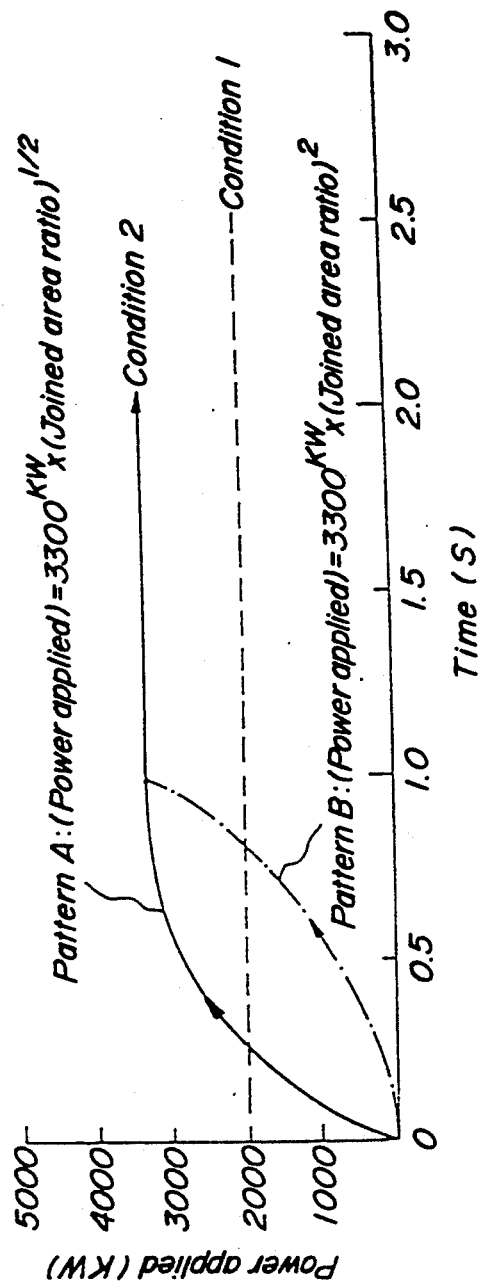

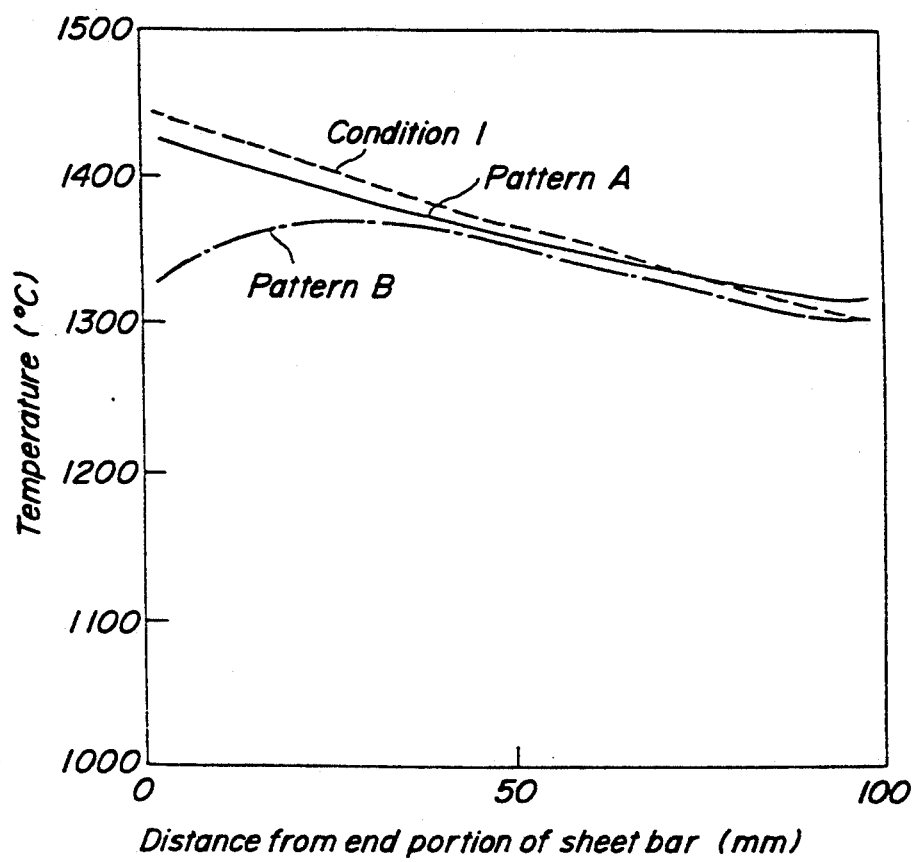
FIG_56

FIG_59
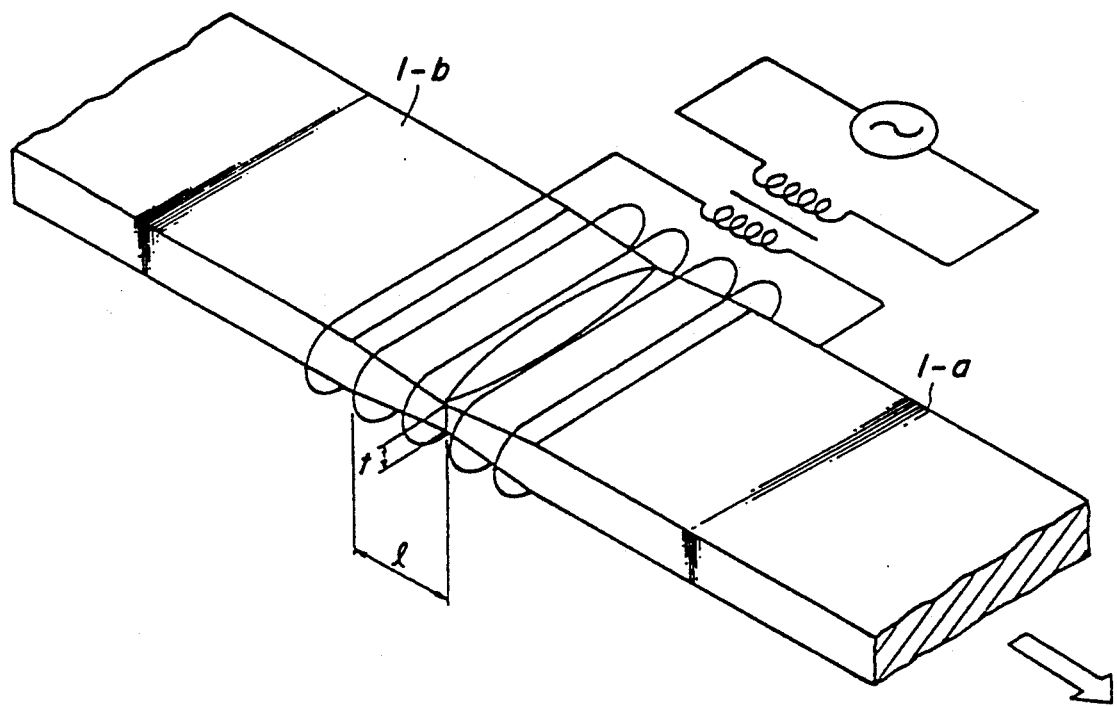

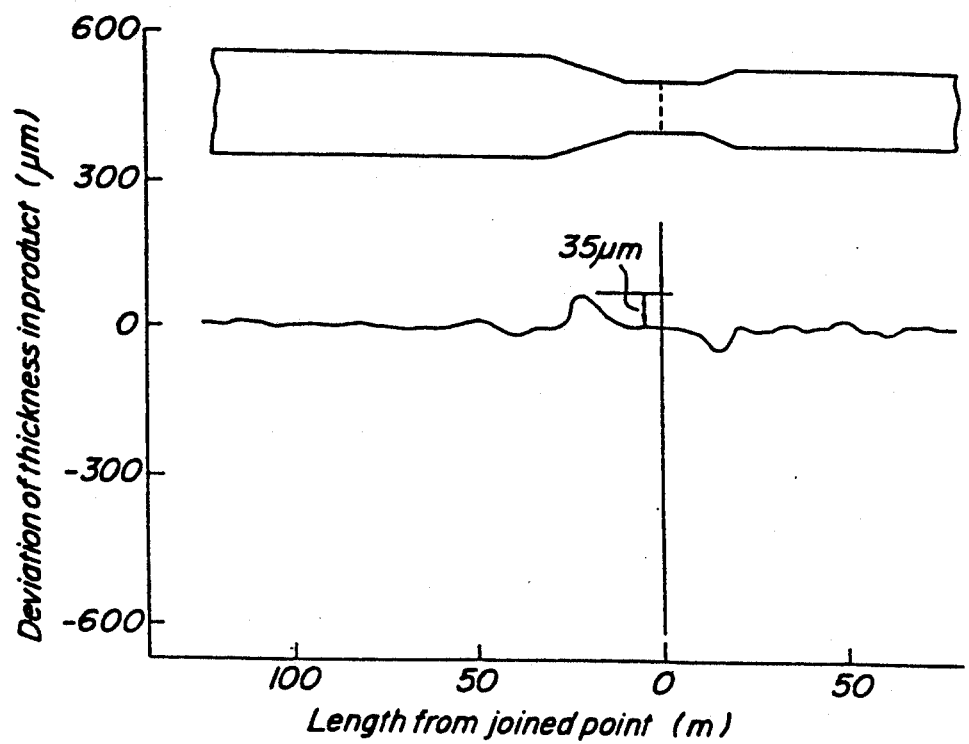
FIG_60(a)
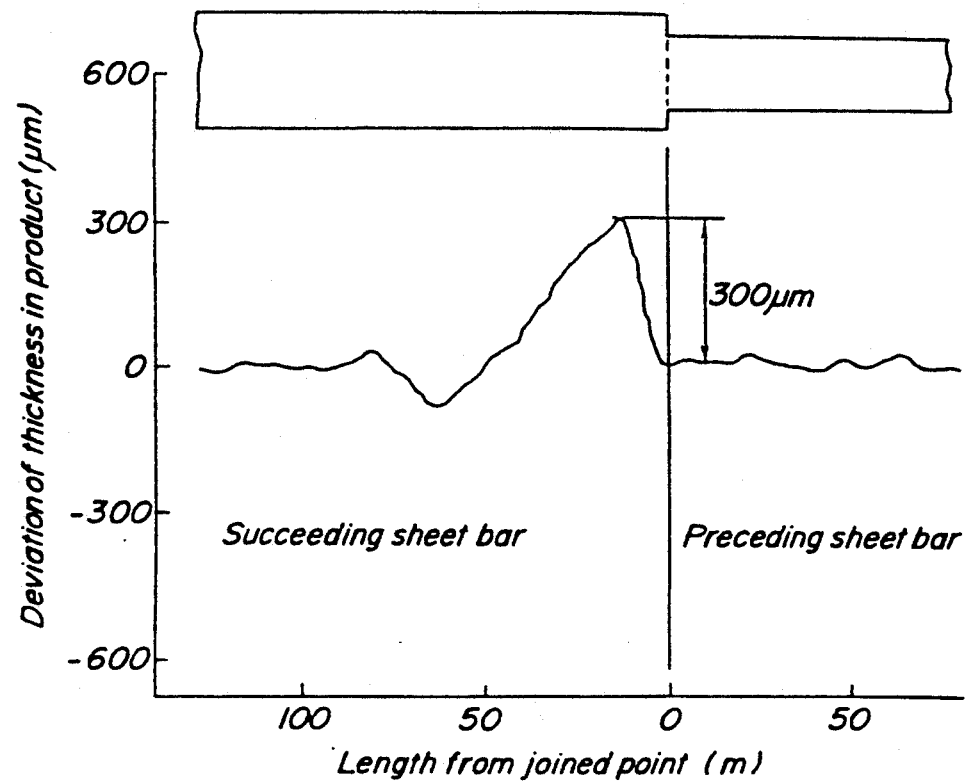
FIG_60(b)

METHOD OF JOINING STEEL SHEET BARS IN HOT ROLLING AND A CONTINUOUS HOT ROLLING METHOD

TECHNICAL FIELD

This invention relates to a method of joining steel sheet bars inclusive of slab with each other in hot rolling as well as a continuous hot rolling method, and is more particularly to attain a rapid and simple joining operation.

BACKGROUND ART

In the hot rolling of the steel sheet bar, since steel sheet bars inclusive of slabs taken out from a heating furnace hitherto been rolled individually, there were various troubles encountered later at a finish rolling step:

a) poor biting of front end of the sheet bar;
b) reduction of back end of the sheet bar;
c) running trouble of front end of the sheet bar on a run-out table; and
d) poor size in front and back ends of the sheet bar.

As a countermeasure on the above problems, there is proposed a continuous rolling method wherein a back end portion of a preceding sheet bar is successively joined with a front end portion of a succeeding sheet bar at an entry-side transfer line of a hot finish rolling mill and then subjected to finish rolling, and also there are various methods of joining the sheet bars.

For example, Japanese Patent laid open No. 60-244401 discloses an induction heating pressure welding method using a so-called solenoid type coil S (see FIG. 8), and also Japanese Patent laid open No. 61-159285 discloses an electric heating pressure welding method using an electrode roll.

Furthermore, Japanese Patent laid open No. 61-144203 discloses a joining wherein the front end portion of the succeeding sheet bar is butted to the back end portion of the preceding sheet bar and at least side edge regions in widthwise direction at the butted portion are preliminary joined and rolled at a reduction of not less than 20%.

However, in the methods disclosed in Japanese Patent laid open No. 60-244401 and Japanese Patent laid open No. 61-159285, the full back end face of the preceding sheet bar and the full front end face of the succeeding sheet bar are joining faces and the heating is carried out over a whole area of such joining faces, so that there are caused the following problems:

i) A great amount of power is required in the heating;
ii) The heating time required for obtaining a given joining temperature is long; and
iii) When the heating is carried out at a state that the operation of the heating equipment is stopped, a long loop is required, while when the heating is carried out during the running of the sheet bar, it si required to take a long running distance and hence the equipment length becomes long.

Furthermore, the method disclosed in Japanese Patent laid open No. 61-144203 has problems that a long time is required for obtaining sufficient joining strength, and the problem of the item iii) is still restrained, and also iv) The joining operation is complicated.

SUMMARY OF THE INVENTION

It is an object of the invention to advantageously solve the above problems and to provide a rapid and simple joining method as well as a continuous hot rolling method using such a joining method.

The inventors have made various studies in order to solve these problems and found that in the joining of the sheet bars, it is not always required to join the butted faces of the preceding and succeeding sheet bars over the full area thereof and hence it is enough to join at least both side edge regions at a given ratio.

Furthermore, the inventors have found that when the joint region between the end portions of the preceding and succeeding sheet bars is subjected to a finish rolling, a special means is added at an initial stage of the finish rolling to realize a stronger joining.

BRIEF DESCRIPTION OF THE DRAWINGS

FIG. 1 is a diagrammatic view of a transfer line at an entrance side of a finish rolling mill including a joining apparatus suitable for carrying out the invention;

FIGS. 2(a)–(g) are plan views of preferable cut shapes at back and front end portions of a preceding sheet bar and a succeeding sheet bar according to the invention;

FIG. 3 is a diagrammatical view of an induction heating apparatus (split type) of transverse system according to the invention;

FIG. 4(a) is a schematic view showing a flow of eddy current induced by the transverse system, and FIG. 4(b) is a graph showing a temperature distribution of a butted region when heating by the same system;

FIG. 5 is a diagrammatic view of an induction heating apparatus (c-shaped) of another transverse system;

FIGS. 6(a) and (b) are schematic views showing a change of end portion shape of sheet bars before and after pushing;

FIG. 7 is a graph showing a relation between joining margin and presence or absence of breakage in finish rolling;

FIG. 8 is a diagrammatical view of the conventional solenoid type coil;

FIGS. 9(a) and (b) are schematic views showing an inclined state of joint face due to the difference of deformation resistance at both side edge regions and a state of forming a gap in joint portion by melt down at high-temperature side region;

FIG. 10 is a diagrammatical view of an induction heating apparatus (split type) of transverse system;

FIG. 11(a) is a schematic view showing a flow of eddy current induced by the transverse system, and FIG. 11(b) is a graph showing a temperature distribution of a butted region when heating by the same system;

FIG. 15 is a schematic view of a flat shape at joint portion between sheet bars;

FIG. 16 is a schematic view of joining point between sheet bars;

FIG. 18(a) is a schematic view of joining point using the heating through alternating magnetic fields, and FIG. 18(b) is a graph showing a difference of a changing rate of joining length in widthwise direction of sheet bar at joining region by difference of pushing treatment;

FIG. 19 is a diagrammatical view of a rolling line including an apparatus for controlling the changing rate of joining length;

FIG. 20 is a graph showing a relation between thickness of sheet bar and frequency of current applied to an induction heating coil;

FIG. 21 is a diagrammatical view of a construction of a hot rolling mill;

FIG. 24 is a schematic view showing an arrangement of anvils;

FIG. 25 is a graph showing a relation between thickness difference of sheet bars and temperature difference;

FIG. 26 is a graph showing a prediction of temperature rising curve from measured temperature data;

FIG. 27 is a graph showing a prediction of temperature rising curve from a preset system;

FIG. 30(a) is a schematic view illustrating an unjoined condition of a gap portion accompanied with the rolling; FIG. 30(b) is a schematic view illustrating a joined condition of a gap portion accompanied with the rolling;

FIG. 31 is a graph showing an influence of shearing deformation amount Y upon joining strength as a relation between shearing deformation amount ratio k and joining strength ratio;

FIG. 32 is a graph showing a relation between reduction ratio and gap amount as a parameter of thickness for obtaining good joined state;

FIG. 33 is a diagrammatical view of a construction of a rolling mill;

FIG. 34 is a schematic view illustrating shapes of sheet bars at joint portion;

FIG. 35 is a schematic view illustrating shapes of sheet bars at joint portions;

FIG. 36 is a schematic view of joining point between sheet bars;

FIG. 37 is a schematic view of rolling of sheet bars;

FIG. 38 is a schematic view of a joined state between preceding sheet bar and succeeding bar sheet;

FIG. 39 is a schematic view illustrating a flat shape at joint portion of sheet bars;

FIG. 40 is a schematic view illustrating a flat shape at joint portion of sheet bars;

FIG. 41 is a schematic view illustrating a flat shape at joint portion of sheet bars;

FIG. 42 is a diagrammatical view of a construction of a rolling mill;

FIG. 43 is a schematic view illustrating a flat shape at joint portion of sheet bars;

FIG. 44 is a schematic view illustrating a flat shape after the joining;

FIG. 45 is a schematic view of joining point between sheet bars;

FIG. 46 is a perspective view of a sheet bar;

FIG. 47 is a perspective view of a sheet bar after the rolling;

FIG. 48 is a schematic view of a rolling state of sheet bars;

FIG. 49 is a schematic view of a joined state between preceding sheet bar and succeeding sheet bar;

FIG. 55 is a graph showing a relation between joining time and power applied;

FIG. 56 is a graph showing a relation between distance from widthwise end portion and temperature;

FIG. 59 is a schematic view showing a joined state sheet bars according to examples; and FIG. 60(a) and (b) are graphs showing a state of changing thickness in a longitudinal direction of a product respectively.

In FIG. 1 is diagrammatically shown a transfer line including a joining apparatus preferable for carrying out the invention at an entrance side of a finish rolling mill.

Figure 12:
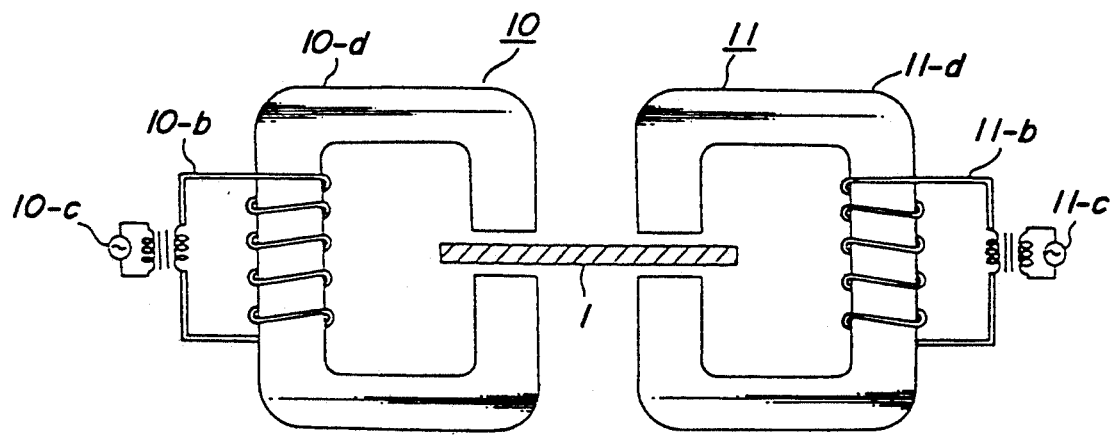
FIG. 12 is a diagrammatic view of an induction heating apparatus (C-shaped) of another transverse system.

In this figure, numerals 1-a, 1-b are a preceding sheet bar and a succeeding sheet bar, respectively, numeral 2 a coil box, numerals 3-a, 3-b and 3-pinch rolls, numeral 4 a leveler, numeral 5 a cutting device, and a numeral 6 a joining apparatus. As the joining treatment is synchronized with the running of the sheet bar 1 is illustrated in this figure. On the other hand, when the heating and joining treatment is carried out at a state of stopping the joining apparatus 6, a looper shown by dotted lines 7 is utilized. Moreover, numeral 8 is FSB (descaler), and numeral 9 a first stand of the finish rolling mill.

according to the invention, anyone of the conventionally well-known methods such as shear, gas cutting, laser cutting and the like are suitable as a method of cutting the back and front end portions of the preceding and succeeding sheet bars, but a cutting with a drum shear having two curved edges is particularly adaptable.

In FIGS. 2(a)-(g) are shown favorable cut states of the back and front end portions of the preceding and succeeding sheet bars.

FIG. 2(a) shows a case that the front and back end portions are cut into concave shapes at the same curvature, and FIG. 2(b) shows a case that the cut front and back end portions are concave but the curvatures thereof are different, and FIG. 2(c) shows a case that one of the cut front and back end portions is straight and only the other is concave, and FIG. 2(d) shows a case that one of the cut front and back end portions is convex and the other is concave and the curvature of the concave is somewhat larger than the curvature of the convex, and further FIG. 2(g) shows a case that central regions of the front and back portions are cut out so as to leave a joining margin in each of the both widthwise side edge regions. In all of the above embodiments, only both widthwise side edge regions of the sheet bars are contacted with each other to leave the gap at the central region thereof. However, the invention is not limited to the above cut shapes and may take a case that the front and back end portions are contacted at three points of both side regions and the central region as shown in FIGS. 2(e) and (f) to form gaps therebetween, or a case that the contact points are 4 or more and gaps are formed between these points as not shown.

In the invention, the heating means is not particularly restricted. A gas burner, electric heating, induction heating and the like may be used. An induction heating of a system uses alternating magnetic fields which are applied to pass through a thickness direction of the sheet bar as shown in FIG. 3. Such a magnetic field applying system is called a transverse system hereinafter and is particularly advantageous.

In FIG. 3, numeral 10 is an alternating magnetic field generating coil for generating the alternating magnetic fields so as to pass in a thickness direction of the sheet bar 1. Such an alternating magnetic field generating coil 10 comprises a pair of cores 10-a sandwiching the sheet bar from up and down directions, a coil 10-b continuously extending from these cores and a power source 10-c.

When alternating magnetic field d is applied to the central region of the butted portions a of the preceding and succeeding sheet bars through the transverse system as shown in FIG. 3, eddy current e as shown in FIG. 4(a) is induced in the butted portions a and the contact regions at both ends of the butted portions are preferentially heated as shown in FIG. 4(b), so that such an induction heating system is particularly advantageous in the case that the heating of at least both widthwise side edge regions of each of the sheet bars is important as in the invention. Moreover, when the contact region includes a central region or other regions in addition to the both side edge regions, these contact regions may preferentially be heated by arranging a given number of alternating magnetic field generating coils in place. In FIG. 3 is shown a case of using a so-called split-type alternating magnetic field generating coil in which the cores separately sandwich the sheet bar from up and down directions as an alternating magnetic field applying coil of the transverse system. Further, there may be used a so-called C-shaped alternating magnetic field applying coil using C-shaped one-piece body 10-d as a core. Such a C-shaped coil has advantages that the operation handling is easy when the joining treatment is carried out by moving the magnetic field applying coil so as to synchronize with the movement of the sheet bar, and the alignment of magnetic pole can be conducted simply and accurately.

The temperature for well proceeding the joining is not lower than 1250° C. However, if the heating temperature is too high, there is caused a fear of melting down the end portion of the sheet bar, so that the heating temperature is preferably not higher than 1450° C.

The back end portion of the preceding sheet bar and the front end portion of the succeeding sheet bar are firstly cut into a concave shape at these ends by means of a cutting device as shown in FIG. 6(a).

Then, these concave joining faces are butted to each other at a contacting or approaching state, which is subjected to heating and pushing treatment. As such a heating and pushing treatment, use may be made of any methods as mentioned below:

i) a method in which the heating is stopped when the temperature at portions to be joined reaches to a target temperature and then the pushing is conducted;

ii) a method in which the pressing is started with heating (not exceeding a melting point of the sheet bar) if the temperature at portions to be joined reaches a joinable temperature;

iii) a method in which the sheet bars are pressed with each other and at the same time the heating of the contact portions is conducted; and iv) a method in which the pushing is conducted to a given joining margin (preferably the joining margin at both side edge regions is not less than 1/10 of the width of the sheet bar) and then the heating is conducted.

By the above heating and pushing treatment, the deformation is started from high-temperature both side edge regions and the joining region is gradually enlarged from both side edge regions toward the central region as shown in FIG. 6(b) to effectively enhance the joining force.

The joining margin W is preferably not less than 0.1 times of sheet bar width B in each of at least both side edge regions, i.e. it is not less than 0.2 times in total. When the total joining margin is less than 0.2 times of the sheet bar width, there is a fear of causing the breakage between the joined preceding and succeeding sheet bars at subsequent finish rolling.

FIG. 7 shows results measured of a relation between the joining margin and the occurrence of breakage in finish rolling.

As seen from this figure, when the joining margin W at each of both side edge regions is not less than 0.1 times of sheet bar width B, there if no fear of causing breakage in the subsequent finish rolling.

Moreover, the pushing treatment can easily be carried out by pinch rolls arranged so as to sandwich the butted region of the end portions of the sheet bars from front and back sides. In this case, the pushing force is sufficient to be about 3-5 kg/mm$^2$.

A portion to be actually heated is only a portion to be joined, so that it is not necessary to heat the full widthwise region of the sheet bar as in the conventional technique and hence the quality of power applied can be reduced as compared with the conventional one and also the time heating to the joining temperature can be shortened. Therefore, when the heating is carried out at a state of stopping the joining apparatus, the loop length can be shortened, while when the heating is carried out during the running of the apparatus, the running distance can be shortened. After the heating to a given joining temperature, the desired joining strength is obtained only by lightly pushing with, for example, pinch rolls, so that the complicated joining operation is not required.

When the induction heating of transverse system is adopted as a heating means, the heating time can be shortened.

Thus, the time required when the back end portion of the preceding sheet bar are joined in the transfer line at the entrance side of the finish rolling mill can largely be reduced as compared with the conventional technique, and also the heating equipment may be miniaturized and the length thereof may be shortened.

At the height of the finish rolling, the sheet bar is still at a high temperature state of about 1000°–1100° C., so that the joining between the sheet bars somewhat proceeds even by simple pushing. On the contrary, when the heating is carried out while conducting the pushing treatment, the joining is effectively promoted, and consequently the more shortening of the joining time and the reduction of power quantity required for the heating can be expected.

From the above reason, it is desirable to simultaneously conduct the pushing treatment and the heating treatment.

In the aforementioned heating treatment, when a single heating means is used, it is impossible to separately control the temperatures at both joining side edge regions, so that there are caused the followings:

a) when the temperature difference is created between both side edge regions, the joint face is inclined due to the difference resistance (see FIG. 9(a));

b) when the temperature at one region is extremely higher than that of the other region, melt down w is caused at the high-temperature side region to create a gap in the joint portion (see FIG. 9(i b)).

In any case, the uniform joining force is not obtained in the widthwise direction of the sheet bar and hence the good joint face is not obtained.

In FIG. 10, numerals 10 and 11 are so-called alternating magnetic field generating coils of transverse system generating the alternating magnetic field so as to pass in the thickness direction of the sheet bar 1, respectively. In this embodiment, the joint region is divided into two zones and the two coils are arranged int he central region of each zone. Each of such alternating magnetic field generating coils 10, 11 comprises a pair of cores 10-a, 11-a arranged so as to sandwich the sheet bar from up and down directions, a core 10-b, 11-b continuously extending from these cores and a power source 10-c, 11-c and can control output power separately. Furthermore, each of numerals 12-a, 12-b is a thermometer, preferably a radiation thermometer, which measures a temperature at each of both side edge regions in the joint portion.

The back end portion of the preceding sheet bar 1-a and the front end portion of the succeeding sheet bar 1-b are cut by means of a cutting device 5 and then both the sheet bars are butted to each other at a contacting state, to which are applied alternating magnetic fields at a joining region through the alternating magnetic field generating coils 10, 11 to start the heating. In this case, the temperature at each heating region is measured by the radiation thermometers 12-a, 12-b, and the heating is continued while controlling the quantity of power applied so as to include the temperature difference between both the regions within not higher than 110° C.

The heating outline of the joint face through the application of alternating magnetic field according to claim 3 is as follows. That is, eddy currents e′ as shown in FIG. 11(a) are induced in the surfaces of the sheet bars by the application of alternating magnetic fields and hence a so-called induction heating is produced by the thus induced eddy currents e′. In the application system a contact part a as a contact electrical resistance is existent in the path of eddy current e′ and Joule's heat based on such a resistance is added, so that the temperature at the contact part a is preferentially raised as shown in FIG. 11(b). Moreover, FIG. 10(a) shows a case that so-called split-type alternating magnetic field applying coils 10, 11 in which the cores are separately arranged so as to sandwich the sheet bar from up and down directions are used as an alternating magnetic filed applying coil of transverse system. On the other hand, so-called C-shaped alternating magnetic filed applying coils using C-shaped one-piece bodies 10-d, 11-d as a core may be used as shown in FIG. 12. Such C-shaped coil has advantages that the operation handling is easy when the joining treatment is carried out by moving the magnetic filed applying coils so as to synchronize with the movement of the sheet bar and the alignment of magnetic poles can be conducted simply and accurately.

The reason why the temperature difference between both the heating regions in the temperature rising through heating is limited to not higher than 110° C. is based on the results examined with respect to a relation between temperature difference of both the regions and inclination of the joint face as shown in FIG. 9(a).

Figure 13:
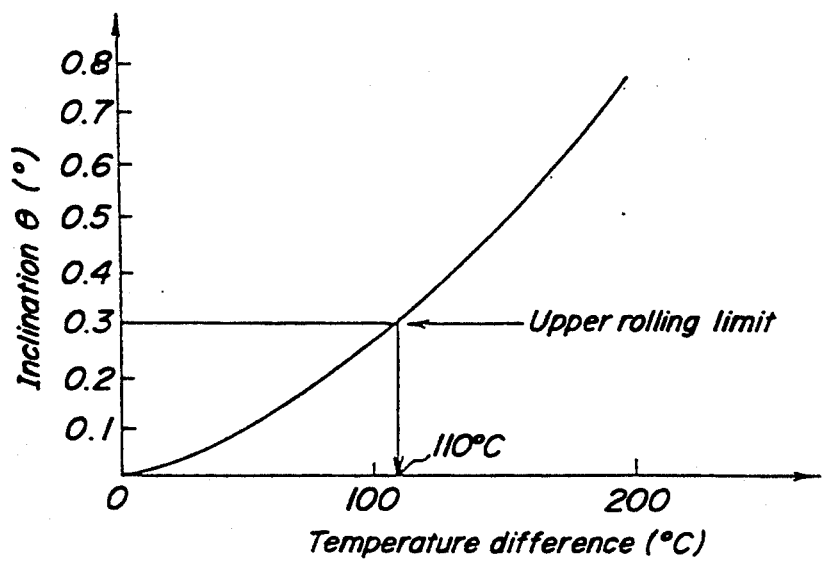
FIG. 13 is a graph showing a relation between temperature difference at both ends of joint face and inclination θ of joint face after the joining.

In FIG. 13 are shown results examined on the relation between temperature difference at both ends of the joint face and inclination of the joint face when the heating is carried out by differing the quantities of power applied to two alternating magnetic field generating coils and stopped at a time that the temperature of high-temperature side joint face reaches 1450° C. for preventing melt down of the joint face and then the sheet bars are pushed to each other. When the inclination ($\theta$) of the joint face exceeds 0.3°, the curving of the succeeding sheet bar becomes large and the back end portion of the succeeding sheet bar protrudes out from the finish rolling mill and hence the rolling is impossible.

As seen from this figure, when the temperature difference between both side edge regions exceeds 110° C., the inclination $\theta$ of the joint face exceeds 0.3° and the continuation of the rolling becomes impossible.

The temperature difference in the heating regions is limited to not higher than 110° C.

There is caused no problem that in the joining of the sheets bars, the joint face is inclined due to the difference of deformation resistance between both end regions of the joint portion and the high-temperature side edge region is melted down to form a gap in the joint portion, so that the uniform joining force is obtained in the widthwise direction of the sheet bar and hence the good joint face is obtained.

Even in the joining method, the uniform temperature distribution over full joint region is not necessarily obtained under specific conditions, i.e. joining conditions that the back end portion of the preceding sheet bar and a part of the front end of the succeeding sheet bar (at least including both end portions in the widthwise direction) are joint faces and the joining area is gradually increased by simultaneously conducting the induction heating of transverse system and the pushing treatment, and consequently there is caused a case that satisfactorily joined state is not sufficiently obtained.

In such a joining system, the induction current induced by the alternating magnetic fields is previously set to be a constant value (the power applied to the induction coil is constant), so that even if the pushing is carried out at a given pushing force, the current density at the joint face lowers together with the enlargement of the joining area and hence the temperature rising rate lowers and the shortening of the time required for the heating is critical. As a countermeasure for avoiding such a problem, it is considered to previously set the power applied to a higher value. In the latter case, both side edge regions of the sheet bar in the widthwise direction takes a relatively long heating time and may melt before the obtention of the required joining margin, so that this countermeasure can not be said to be effective means.

Figure 14:
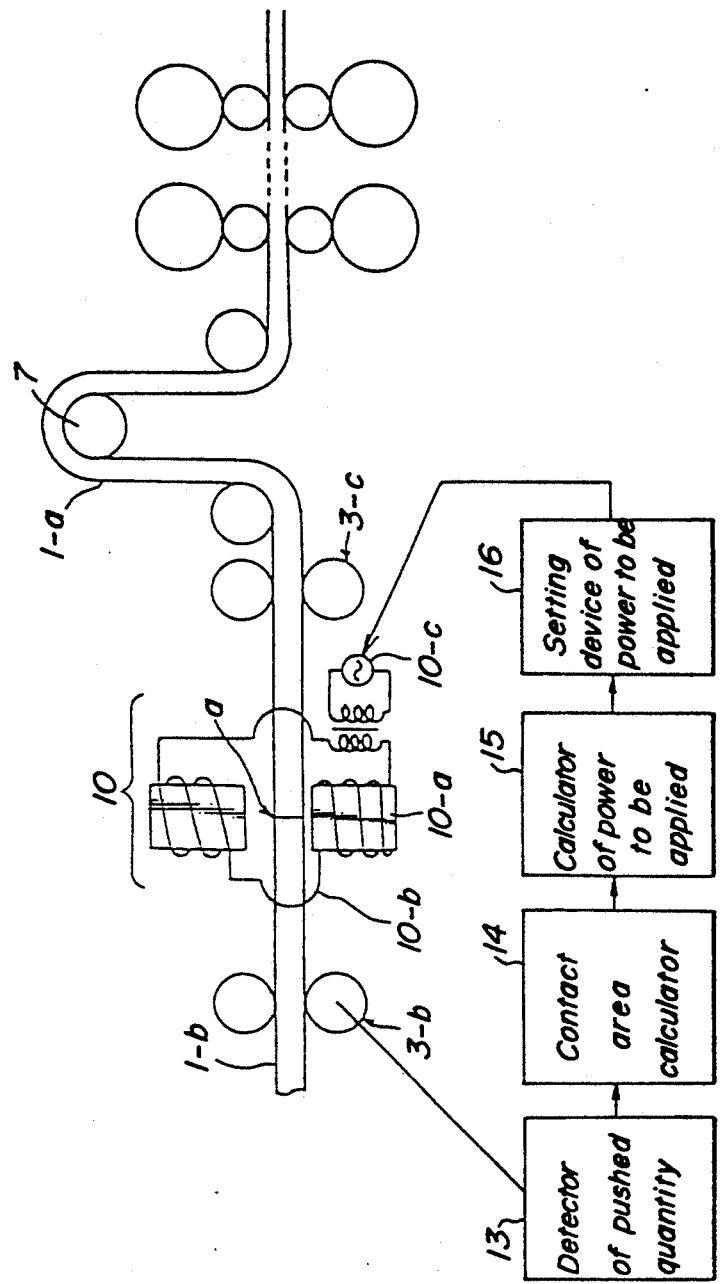
FIG. 14 is a schematic view of a construction of an apparatus.

In FIG. 14 there is diagrammatically shown a construction of an apparatus suitable for carrying out the method. Moreover, the essential part of the construction is common to that of FIG. 1 and is represented by the same numeral. In this figure, numeral 13 is a detector for detecting the quantity of the sheet bar pushed, numeral 14 a calculator for calculating contact area in the joining between the preceding sheet bar 1-a and the succeeding sheet bar 1-b, numeral 15 a calculator for power to be applied, and numeral 16 a setting device of power to be applied.

The back end portion of the preceding sheet bar 1-a and the front end portion of the succeeding sheet bar 1-b are cut into a flat shape as shown in FIG. 15, respectively, and thereafter regions including both side edge regions of the sheet bars are heated as a joint portion (power of induction coil applied is constant) and at the same time they are subjected to a pushing treatment, whereby the joining area is gradually enlarged as shown in FIG. 16. In this case, the current density at the joint face lowers together with the enlargement of the joining area, so that the lowering of temperature rising rate is not avoided and hence it is difficult to shorten the time required for the heating.

The apparatus of the construction as shown in FIG. 14 is applied to increase the power applied to the induction coil 10 generating the alternating magnetic field together with the enlargement of the joining area to thereby gradually increase the heating capacity, so that the joining g region can be heated over its full area to a given temperature that the temperature distribution becomes approximately uniform, and hence the time required for the joining of the sheet bars can more be shortened.

As a concrete control of increasing the power applied in accordance with the enlargement of the joining area, the quantity of the sheet bar pushed is first detected from a rotating angle of the pinch roll 3-b after the beginning of the pushing by means of the detector 13. Then, the contact area at the joint portion is calculated from the pushed quantity by means of the contact area calculator 14. Next, the power to be applied is calculated from the calculated contact area by means of the calculator 15 and the calculated power is input to the power setting device 16, whereby the power source 10-c is adjusted.

Figure 17:
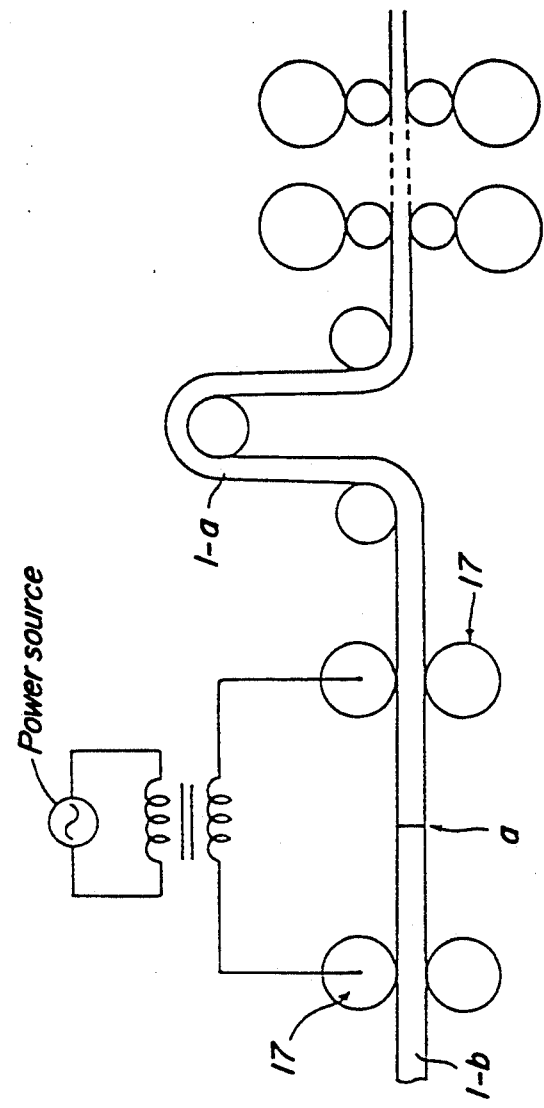
FIG. 17 is a diagrammatical view of a construction of an apparatus suitable for applying an electric heating system.

As the heating means in the local butt joining of sheet bars 1-a, 1b at the entrance side of the finish rolling mill, the case of using the so-called induction heating coil of transverse system has mainly been described in the above embodiment, but even when the electric heating system using electrode rolls 17 as shown in FIG. 17 is used instead of the induction heating coil of the transverse system, the shortening of the joining time can similarly be attained.

Even when the joining of the sheet bars is carried out so as to gradually increase the joining area simultaneously conducting the heating and the pushing treatment while using the back end of the preceding sheet bar and a part of the front end of the succeeding sheet bar as a joint face, the heating can be conducted at such a state that the temperature distribution becomes approximately uniform over the full area of the joint region, so that the portions to be joined can be joined in a very short time without fearing melt down of the widthwise side edge region.

Under joining conditions that a part of each of the preceding and succeeding sheet bars (at least including both side edge regions) is used as a joint face and the joining area is gradually increased by simultaneously conducting the heating and the pushing treatment, the uniform temperature distribution is not necessarily obtained over the full area of the joint region, and consequently there is a case that the joined state is not obtained at a sufficiently satisfactory level.

That is, as shown in FIG. 18(a), when the preceding and succeeding sheet bars having an arc shape cut at each of back and front end portions are butted to each other and heated with pushing, if a constant pushing force corresponding to a contact pressure to final contact area is pushed to the sheet bars, the deformation rapidly proceeds at an initial pushing stage because the contact pressure is large and hence the joint length L in the widthwise direction of the sheet bar becomes rapidly large at the initial stage as shown by dotted lines in FIG. 18(b). On the other hand, the induced current is apt to flow near to a magnetic flux as far ass possible, so that a large current flows around the magnetic flux immediately after the contact of the sheet bars, while the current flowing in an edge region remote from the magnetic flux is very small. As a result, the temperature is not sufficiently raised at the joining edge region and hence the uniform temperature distribution may not be obtained.

A change rate joining length is controlled within a given range as shown by dot-dash line in FIG. 18(b), whereby the large current flowing time immediately after the contacting is substantially uniformalized in the widthwise direction of the joint face, and consequently the temperature is raised so as to attain the uniform temperature distribution in the widthwise direction of the joint face, so that the uniform joining and hence the satisfactory joining strength are obtained and as a result, the stable joining becomes possible.

When the change rate of joining length at each joining region is less than 15 mm/s, the joining takes a long time and the object of the invention aiming at the shortening of the joining time can not be attained, while when the change rate exceeds 130 mm/s, there is caused a case that the temperature can not be raised to a given joining temperature (1250°–1450°). In the invention, the change rate of joining length is limited to a range of 15–130 mm/s (preferably 30–80 mm/s).

Although the change rate may be varied within the above range, it is preferable that the change rate is constant within the above range.

In FIG. 19 there is diagrammatically shown a rolling line including an apparatus of controlling the change rate of joining length.

The essential parts of the construction are common to those of FIG. 14 and are represented by the same numerals. In this figure, numeral 18 is a calculator for the change rate at joining length, numeral 19 a setting device of pushing force, and numeral 20 a motor for the pushing.

In FIG. 19, the actual control for the change rate of joining length is as follows.

At first, the quantity of the sheet bar pushed after the beginning of the pushing is measured from a rotating angle of pinch roll 3-b by means of the detector 13. Then, the change rate of joining length is calculated from the value of the pushed quantity by means of the calculator of the joining length change rate 18. In the setting device of pushing force 19, the calculated value is compared with a previously set value of the change rate of joining length, whereby the pushing force is set so as to render the change rate of joining length into the set value. Thereafter, the pushing force of the pinch roll 3-b is adjusted based on the above set value through the motor for the pushing 20 to control the change rate of joining length within the given range.

Thus, the uniform heating can be conducted over the full area of the joint face, and consequently the uniform joining strength and hence good joined state can be obtained in the widthwise direction.

In the joining method using high frequency heating, there are the following problems when the change of thickness in the sheet bar is not considered.

That is, the high frequency heating lie in that in the heating of the sheet bar, a current of high frequency is applied to an induction heating coil arranged so as to surround a region of the sheet bar to be heated, whereby magnetic fields are applied to the sheet bar to thereby heat the sheet bar by resistance heating of a so-called induction current induced in the sheet bar for a short time. In the induction current induced by the high frequency heating, a permeation depth $d_o$ is represented by the following equation:

$$d_o = \tfrac{1}{2}\pi \cdot (10^7 \rho)^{\tfrac{1}{2}} (\mu_r f)^{-\tfrac{1}{2}}$$

$\rho$: resistivity
$\mu_r$: relative permeability
f: frequency

When a current of higher frequency is applied to the induction heating coil, the induction current is apt to flow near to the surface of the sheet bar, so that only the surface layer of the sheet bar is melted before the full area of the portion to be joined reaches the target temperature (about 1250°–1450° C.), while when a current of relatively low frequency is applied to the induction heating coil, heat dissipation at the sheet bar surface is large, so that the temperature st the central region of the sheet bar in the thickness direction thereof becomes higher than that of the sheet bar surface and consequently such a central region is melted before the full area of the portion to be joined reaches the given temperature. Therefore, the desired joining strength is not necessarily obtained when the thickness of the sheet bar to be joined is not considered.

In the sheet bar supplied to a hot finish rolling line, the thickness is usually changed within a range of about 15–70 mm. Adequate heating and joining can be realized in accordance with the change of the thickness of the sheet bar to be joined.

In FIG. 20 there are shown results examined on the relation between the thickness of the sheet bar and the frequency of the current applied to the induction heating coil in the heating and joining of the sheet bar using the high frequency heating.

In this figure, a zone A is a zone capable of uniformly heating a portion to be joined without causing temperature deviation in the thickness direction at the heating region of the sheet bar, and zone B is a zone that the melting of only the surface layer in the sheet bar is not avoided due to the local temperature rising, and a zone C is a zone that the melting of only the central region in the thickness direction of the sheet bar is not avoided. In the zone A, when the thickness of the sheet bar to be joined is relatively thin, the movement of heat in the thickness direction of the sheet bar is not easily conducted, so that the range of applicable frequency is wider while when the thickness of the sheet bar is relatively thick, the movement of the heat takes a long time, so that the range of applicable frequency tends to become narrow. The portion to be joined is uniformly heated up to a desirable temperature in a short time by applying a current satisfying the above equation (1) of the respective zone to the induction heating coil to thereby apply the produced magnetic fields to the sheet bar.

In FIG. 21 there is shown an embodiment of the hot rolling mill suitable for carrying out a method. In this embodiment, a solenoid type coil 21 surrounding the sheet bar is used as an induction heating coil.

In the joining between the back end portion of the preceding sheet bar 1-a and the front and portion of the succeeding sheet bar 1-b, each of the sheet bars 1-a, 1-b is transferred through the pinch rolls 3-b, 3-c to move a portion of the sheet bar to be joined to a position of the induction heating coil 21, ant the transfer is stopped at once. Then, alternating magnetic fields are generated by the induction heating coil 21 based on the equation (1), which are applied to the sheet bar. As a result, the portion of the sheet bar to be joined is rapidly heated in a short time by resistance heat of the induction current induced by the alternating magnetic fields and flowing in the sheet bar, at state of which the sheet bars are closed to each other by pushing these sheet bars or by subjecting to a heating treatment according to the aforementioned procedure at a prepushed state.

Thus, even when the thickness of the sheet bar changes, the portion of the sheet bar to be joined is uniformly heated over its full area and then joined, so that there is caused no breakage of the joint portion in the rolling and the productivity in the continuous hot rolling can considerably be improved.

When the induction heating system is particularly used as heating means of the sheet bar, it is necessarily to adjust the intensity of magnetic field in accordance with the change of thickness in the sheet bar. For this end, it is required to use a heating apparatus of a large capacity required for the joining of a sheet bar having a maximum thickness.

Further, when the thicknesses of the preceding sheet bar and the succeeding sheet bar are different, the magnetic fields preferentially concentrates in the thicker sheet bar and as a result, only the thicker sheet bar is heated. For this end, it is necessary to apply the magnetic fields in accordance with the thinner sheet bar, and consequently a large power is required and it is difficult to uniformly heat the end portion of each of the sheet bars.

When the thicknesses of the sheet bars are different, even if these sheet bars are joined to each other, the joint portion between the sheet bars may be broken at the subsequent finish rolling step due to insufficient joining. Alternatively, even if the breakage is not caused, automatic gauge control (AGC) can not be followed, so that off-gauge portion is produced and there is caused a fear of lowering a product yield.

A further variation provides a joining method wherein the sheet bars can rapidly and surely be joined without consuming waste energy in the joining of the sheet bars and breaking the joint portion between the sheet bars in the rolling.

Figure 22:
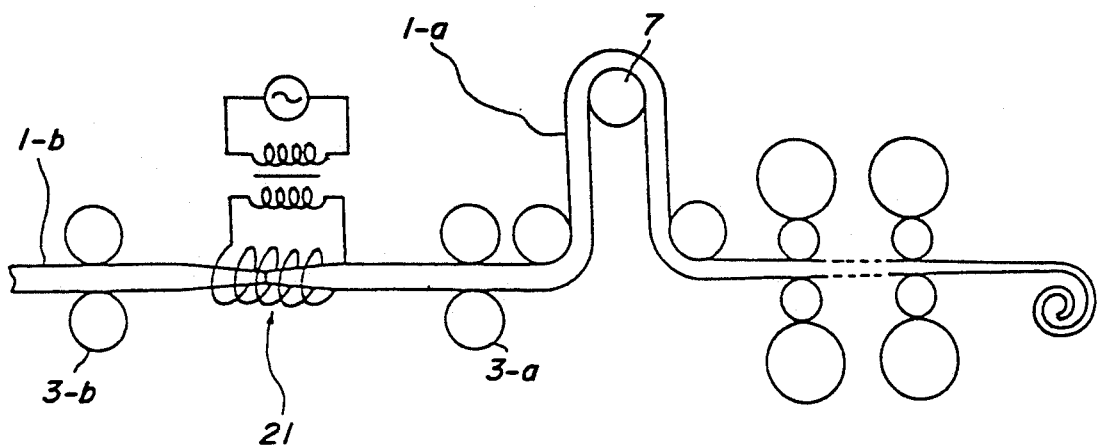
FIG. 22 is a diagrammatical view of a construction of a rolling mill.

In FIG. 22 there is shown another embodiment of the rolling mill. The essential parts of the construction are common to those of FIG. 21 and are represented by the same numerals.

When the alternating magnetic fields are applied by the induction heating coil 21 at an approaching or contacting state through the butting between the back end portion of the preceding sheet bar 1-*a* and the front end portion of the succeeding sheet bar 1-*b*, eddy currents flow in each end portion of the sheet bars 1-*a*, 1-*b* along the widthwise direction and as a result, the temperature of these portions preferentially rises in a very short time Joule's heat. At a time when the temperature reaches the target joining temperature, the sheet bars are pushed with each other, or the aforementioned heating treatment is carried out at a prepushed state, whereby the sheet bars are closely joined to each other in a relatively short time.

In such an induction heating system, it is necessary to adjust the intensity of the magnetic field applied in accordance with the change of thickness in the sheet bar as previously mentioned, and consequently it is required to use the heating apparatus having a capacity required for the joining of a sheet bar having a maximum thickness (the thickness of the sheet bar changes within a range of 30–50 mm in accordance with use purpose). Further, when the thicknesses of the preceding sheet bar and the succeeding sheet bar are different, the magnetic fields preferentially concentrate in the thicker sheet bar to heat only the thicker sheet, so that it is necessary to apply the magnetic field to the accompaniment of the thinner sheet bar. For this end, a great amount of power is required and also it becomes difficult to uniformly heat the end portions of each of the sheet bars. Moreover, even if the sheet bars having different thicknesses can be joined to each other, there may be caused the breakage of the joint portion between the sheet bars st the subsequent finish rolling step. If such a breakage is not caused, when the sheet bars having a large thickness difference are joined and rolled, AGC control can not be followed and an off-gauge portion is produced and hence the lowering of product yield is not avoided.

Either one or both butted regions of the sheet bars 1-*a*, 1-*b* (back end portion of the preceding sheet bar 1-*a*, front end portion of the succeeding sheet bar 1-*b*) can be subjected to a thinning treatment by rolling or forging at a hot rough rolling state or at a height of the above induction heating treatment, so that even when the thicknesses of the sheet bars to be joined are different, the thickness in only the portions to be joined can be equalized and the aforementioned problems can advantageously be avoided.

As the thinning treatment, it is favorable to conduct a tapered working that the thickness is gradually thinned toward the end portion of the sheet bar. Thus, the heating time can be shortened and thermal shock in the rolling can be avoided, and further the followability of AGC is improved. As an embodiment of the thinning treatment, when the preceding sheet bar and the succeeding sheet bar having an equal thickness are joined and continuously rolled, the same working may be conducted in both sheet bars 1-*a*, 1-*b*. On the other hand, when the thickness of one of the sheet bars is thick and that of the other sheet bar is relatively thin, the thicker sheet bar is subjected to the thinning treatment so as to meet with the thickness of the thinner sheet bar, or both the sheet bars are subjected to the thinning treatment so as to obtain an equal thickness. The thickness at the end portion of the sheet bar is experimentally preferable to be about 15–30 mm as a minimum for preventing the occurrence of the breakage in the rolling.

Figure 23:
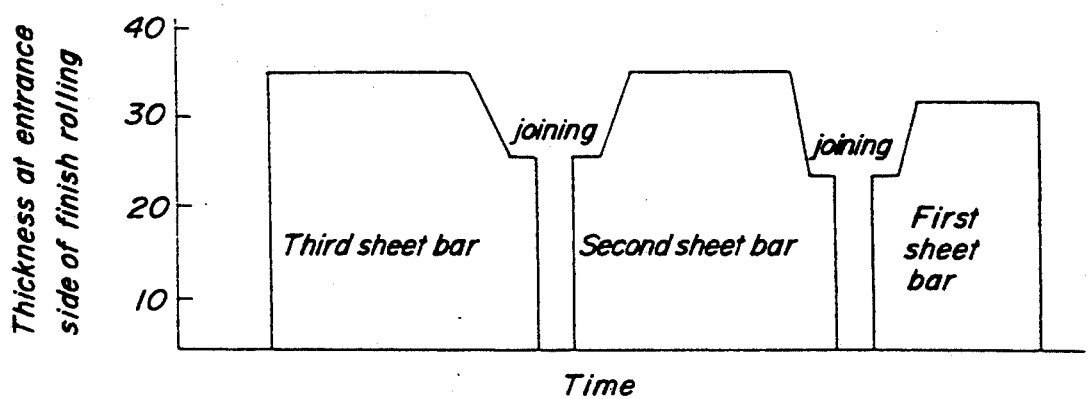
FIG. 23 is a schematic view showing a joining point of several sheet bars.

In FIG. 23 is shown a state that the sheet bars having different thicknesses are joined and subjected to continuous hot rolling.

For example, when the forging is carried out as the thinning treatment at a prestige of the heating treatment, anvils are preferably used. As shown in FIG. 24, a pair of anvils 22 each having an entrance slant 22*a* working the front end portion of the succeeding sheet bar 1-*b* and a delivery slant 22*b* working the back end portion of the preceding sheet bar 1-*a* are arranged so as to sandwich the sheet bar from upward and downward sides in the thickness direction of the sheet bar, and reciprocal movement of these anvils 22 for mutual approaching and separating is conducted to thin the end portion of the sheet bars at an inclination equal to the entrance slant 22*a* or delivery slant 22*b*.

FIG. 25 is shown a state of temperature difference based on the thickness difference when the sheet bars having different thicknesses are joined, from which it is apparent that the larger the thickness difference, the larger the temperature difference of joint face.

Moreover, the use of solenoid system is described as an induction heating coil, but the induction heating coil of transverse system can naturally be used.

Thus, the back end portion of the preceding sheet bar and the front end portion of the succeeding sheet bar can rapidly and surely be joined to each other at the same thickness irrespectively of the change of thickness of the sheets bars, so that the continuous hot rolling can be realized with high productivity. Furthermore, the capacity of the heating apparatus can be reduced and the pushing force in the joining of the sheet bars is relatively small, and also off-gauge in the vicinity of the joint portion can be avoided as far as possible.

In the joining of the sheet bars, it is necessary to heat the joint portion from 1250° C. to a joinable temperature just beneath a melting point, but is advantageous that the joining temperature is set to a high temperature region near to the upper limit. Because, the sheet bar is softened as the temperature becomes higher, so that the joining by pushing is easy. However, when the heating temperature exceeds the melting point, melt down w is caused in a part of the joint portion to form a gap in the joint portion as shown in FIG. 9(*b*) and consequently the uniform joining force and hence the good joint face is not obtained in the widthwise direction of the sheet bar. Therefore, it is important that the heating temperature does not exceed the melting point of the sheet bar.

However, when the heating is carried out by setting the target temperature to a temperature just beneath the melting point through the above induction heating system, if the heating is stopped at a time that the value measured by a thermometer is the target temperature, the heating temperature may exceed the melting point due to delay of the control system. That is, the induction heating system is rapid heating, so that the occurrence of over-heat due to slight time-lug of the control system becomes large.

Not only the solenoid system shown in FIG. 8 but also the transverse system shown in FIG. 3 may be used as the induction heating system.

The back end portion of the preceding sheet bar and the front end portion of the succeeding sheet bar are first cut by means of the cutting device.

Then, these end portions are butted to each other and subjected to the heating and pushing treatment. In such a treatment, when using the induction heating system, since it is rapid heating, the over-heat is undesirably caused due to slight time-lug of the control system.

Therefore, the temperature rising curve to the target temperature is expected from the initial temperature of the sheet bar and the temperature rising rate, and then the time reaching o the target temperature is calculated from the expected curve, and the heating is carried out based on the calculated result.

For example, the expectation of temperature rising curve ia as follows:

As shown in FIG. 26, when a target temperature is $\theta_F$ (° C.), an initial temperature is $\theta_1$ ($_oC$.), a temperature of sheet bar after a time $t_1$ (s) from the start of the heating is $\theta_2$ (° C.), and further a temperature of sheet bar after time $t_2$ (s) is $\theta_3$ (° C.), a time $(t_1+t_2)$ from the start of the heating is represented by the following equation:

$$t = A \ln(B - \theta_f)/(B - \theta_3) \qquad (1)$$

In this case, A and B are represented by the following equations:

$$A = t_2/ln(B - \theta_3)/(B - \theta_2) \qquad (2)$$

$$B = 1 - (\theta^2_2 - \theta^2_1 + \theta_3 - \theta_2)/2(\theta_2 - \theta_1) \qquad (3)$$

When the heating is stopped after t second, however there is still a fear of the over-heat due to the time-lag of the control system.

Therefore, considering such a time-lag, when the time-lag is $t_L$, the heating is stopped after $(t-t_L)$, whereby the temperature can exactly be raised to the target temperature.

The above is described with respect to the case that the temperature rising curve is presumed from data of temperatures measured after the heating. However, a preset system as mentioned later can determine the time reaching to the target temperature without conducting the temperature measurement as mentioned above.

That is, when an applied power: W (w), a specific heat of a sheet bar: C (J/kg), a density of sheet bar: $\rho$ (g/cm$^3$). a thickness of sheet bar: D (mm), and an initial temperature of sheet bar; $\theta_1$ (° C.), a target temperature after the heating: $\theta_F$ (° C.), the time reaching to the target temperature t as shown in FIG. 27 is represented by the following equation:

$$t = a_1 c \rho D \ln(a_2 W - \theta_F)/(a_2 W - \theta_1) \qquad (4)$$

wherein each of $a_1$, $a_2$ is a constant.

Of course, it is necessary to add the time-lag even in the preset system.

According to the preset system, it is enough to measure only the initial temperature as the temperature measurement, so that it has a merit that the temperature need not be particularly measured after the start of the heating.

Thus, even when the induction heating system being rapid heating is used as the heating method of sheet bar, the temperature can exactly be raised to the target temperature and there is caused no occurrence of the over-heat.

In the joining method according to the invention, unjoined region is existent between previously joined portions, so that is preferable that such an unjoined region is joined at subsequent finish rolling. Particularly, when tension-controlled rolling is carried out for controlling the width of the sheet bar in the finish rolling, the joining is desired to be completed at a pass in the prestige, preferably a first pass as far as possible. However, the joining is not completed at the prestige pass in accordance with the size of the gap, and it is difficult to obtain a sufficient joining strength.

The foregoing method provides a better joined state by restricting thickness H of sheet bar at entrance side of finish rolling mill, accumulative reduction ratio r at prestige of finish rolling and constant k in the aforementioned equation to 20–50 mm, 0.20.–0.60 and 0.15–0.35, respectively.

The mechanism of joining by rolling will be described with reference to the drawing below.

Figure 28:
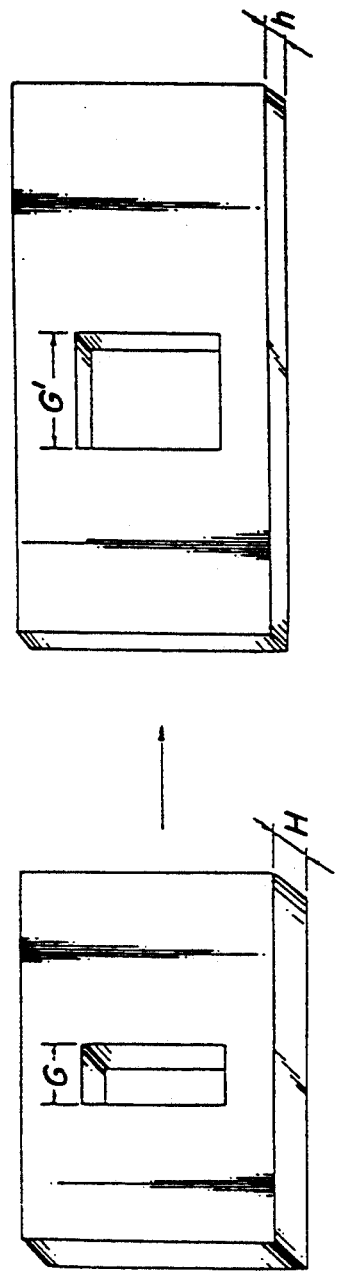
FIG. 28 is a schematic view showing an enlarging action of a gap accompanied with the rolling.

1) The gap G is enlarged to $G \times (H/h)$ (wherein H is a thickness at entrance side, and h is a thickness at delivery side) together with the decrease of the thickness of the sheet bar through biting of rolls (gap enlarging action, see FIG. 28).

Figure 29:
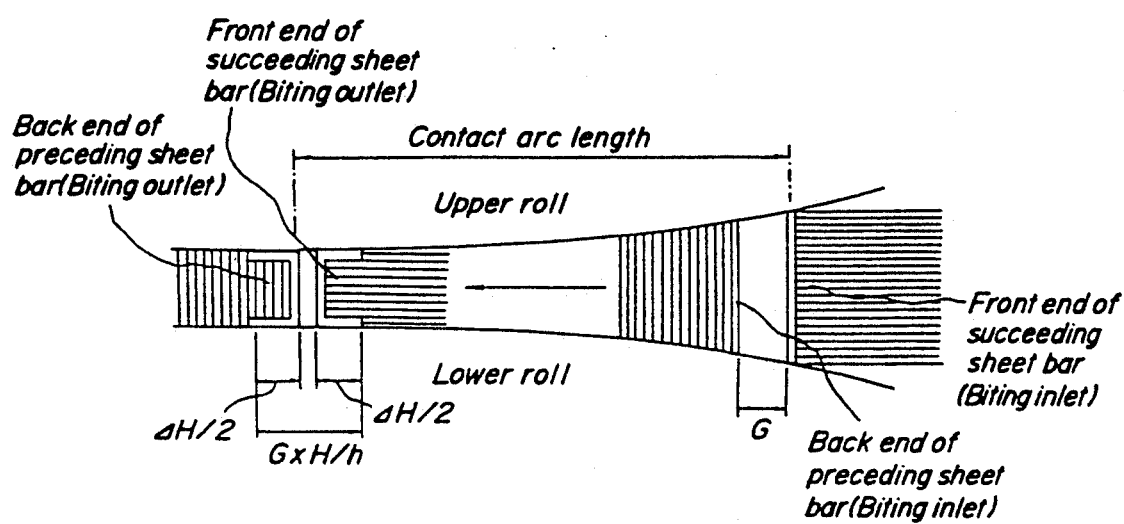
FIG. 29 is a schematic view showing a narrowing action of a gap accompanied with the rolling.

2) In each of the front end portion of the preceding sheet bar and the front end portion of succeeding sheet bar, metal flow of a length corresponding to $\Delta H/2$ (wherein $\Delta H$ is a rolling draft $\Delta H - h$) is caused backward and forward in the longitudinal direction with the decrease of the thickness of the sheet bar through the biting of rolls (gap narrowing action, see FIG. 29).

3) Since the deformation in the roll biting is considered to be produced over a full region of contact arc length at a first pass in the finish rolling, the shape of the gap at delivery side of the roll biting is determined by the difference between the above items 1) and 2) (see FIG. 30).

That is, a)
$$G \times (H/h) - (\Delta H/2) \times 2 > 0 \qquad (1)$$

In the above case, the gap remains and the sheet bars are not joined (FIG. 30(a)), b)
$$G \times (H/h) - (\Delta H/2) \times 2 > 0 \qquad (2)$$

In the above case, the gap is closed and the sheet bars are joined (FIG. 30(b)).

4) In order to obtain good joining strength, it si insufficient to merely close the gap, and it is necessary to conduct shearing deformation in the longitudinal direction.

When the shearing deformed quantity is Y, the following is established:

$$Y = (\Delta H/2) \times 2 - G \times (H/h) \qquad (3)$$

According to the inventor's studies, in order to obtain a necessary joining strength (it is sufficient to be not less than ⅓ of the strength of matrix), it has been found that the following is established:

$$\geq k \times h \qquad (4)$$

wherein k is a constant determined in accordance with the rolling conditions.

In FIG. 31 are shown results measured on a relation between shearing deformed quantity Y and joining strength as a relation between ratio of shearing deformed quantity k and ratio of joining strength.

As seen from this figure, in order to obtain the joining strength corresponding to not less than ⅔ of the matrix strength, the ratio of shearing deformed quantity k is 0.15 at minimum and about 0.25 on average.

In this case, when the ratio of shearing deformed quantity k is too small, the sufficient joining strength is not obtained, while when it is too large, there is no problem in the joining strength but the acceptable gap amount becomes insufficient, so that k is preferable to be about 0.15–0.35.

Moreover, when the constant k is set to 0.25 as a general value, if G=0, Y=$\Delta H \geq 0.25 \times h$, which is equal to reduction ratio $\geq 0.20$.

The equations (3) and (4) are rearranged as follows:

$$(\Delta H/2) \times 2 - G \times (H/h) \geq k \times h \quad (5)$$

$$G \leq H \times (1-r) \times \{(1+k) \times r - k\} \quad (6)$$

where r is a reduction ratio ($=\Delta H/H$).

Therefore, when the shape of the gap establishes the above equation (6), the good joining strength can be obtained at the prestige pass of the finish rolling.

If it is intended to complete the joining at the first pass of the finish rolling, various conditions may be set so that the rolling condition of the first pass satisfies the relation of the equation (6).

The thickness at entrance side H is preferable to be about 20–50 mm from viewpoints of cutting ability of crop shear at the end portion of the sheet bar and rolling ability of the finish rolling mill. Furthermore, the reduction ratio r is preferable to be about 0.20–0.60, because when it is less than 0.20, even if the gap amount is 0, the joining is impossible, while when it exceeds 0.60, the gap enlarging action is conspicuous and the efficiency is poor. Moreover, the ratio of shearing deformed quantity k is preferable to be about 0.15–0.35, because when it is too small, the sufficient joining strength is not obtained, while when it is too large, there is no problem in the joining strength but the acceptable gap amount becomes insufficient.

In FIG. 32 is shown a relation between favorable gap amount and reduction ratio when the ratio of shearing deformed quantity k is 0.25 and the thickness is 20, 30, 40 or 50 mm.

In this figure, a zone surrounded by oblique lines is a range providing a good join state.

Thus, even in case of partial joining having a gap at joint region, such a gap portion can completely be joined at the prestige pass of subsequent finish rolling, so that the hot finish rolling can stably be continued.

When the gap formed between the mutual sheet bars is not completely removed at the rolling step, if the rolling is particularly carried out while applying tension for adjustment of the width, it can not be said that no breakage is caused in the joint portion.

The above problem by providing a method wherein the sheet bars are simply and rapidly joined to each other at the entrance side of the rolling mill and at the same time the joining between the sheet bars can be made more rigid with the advance of the finish rolling.

In FIG. 33 is shown numeral 23, a rolling reduction apparatus (provided with reduction rolls capable of varying the arranging position and the like) arranged st the entrance side of the finish rolling mill and subjecting the back end portion of the preceding sheet bar 1-a (including an end face) and/or the front end portion of the succeeding sheet bar 1-b (including an end face) to the thinning treatment in the vicinity of at least both side regions in the widthwise direction.

In the hot rolling of the sheet bar, as shown in FIG. 34, either one of the back end portion of the preceding sheet bar 1-a and the front end portion of the succeeding sheet bar 1-b or both is subjected to the thinning treatment in the vicinity of at least both side edge regions in the widthwise direction by the rolling reduction apparatus 23, and then the contact region at the butted state between the back end of the preceding sheet bar 1-a and the front end of the succeeding sheet bar 1-b is rendered into a region subjected to the above thinning treatment by cut working through a cutting device 5 provided with curved edge or the like as shown in FIG. 35. As shown in FIG. 36, compression stress is produced in the vicinity of both side edge regions of the preceding sheet bar 1-a and the succeeding sheet bar 1-b by a combination of the heating through the heating device 6 and the pushing through the adjustment of transferring rates of the sheet bars 1-a, 1-b to mutually close these bars to each other, and then the sheet bars are fed to a finish rolling mill at such a state to conduct hot finish rolling of the sheet bar.

In the butt joining between the preceding sheet bar 1-a and the succeeding sheet bar 1-b at the entrance side of the hot finish rolling mill, only the vicinities of both side edge regions of the sheet bars in widthwise direction are locally joined as shown in FIG. 36, so that both sheet bars are joined at a state having a gap g for a very short time. When the rolling as shown in FIG. 37 is conducted in the finish rolling mill at such a state, the end faces of the preceding sheet bar 1-a and the succeeding sheet bar 1-b are strongly joined over a full area in the widthwise direction by promotion of metal flow (longitudinal direction and widthwise direction of the sheet bar) at a central region in widthwise direction of the front and back end portions of the sheet bars 1-a, 1-b as shown in FIG. 38, and consequently there is simply caused no breakage between both the sheet bars even if tension is applied to the rolled material for adjusting the size of the width in the finish rolling.

In the thinning treatment in the vicinity of both side edge regions of the sheet bar, when the thickness before the treatment is T and the thickness after the treatment is t, it is preferable that the ratio t/T is within a range of 0.4–0.95. When the ratio is less than 0.4, the thinned portion is not rolled at the first pass of the finish rolling mill, while when it exceeds 0.95, the sufficient joining strength is not obtained. Furthermore, as an area of the thinned region, it is preferable that the width is a pre-joining margin (one-side $0.1 \times W$) and the length is a length of a contact ratchet of a roll bite ((roll radius $\times$ reduction draft)$^{\frac{1}{2}}$ 50–80 mm).

As a means for the thinning treatment, an anvil for forging and the like may be used in addition to the apparatus provided with pressure rolls as shown in FIG. 33.

As the cut shape st the end portion of the sheet bar, use may be made of various shapes such as a shape that the end portions of the preceding sheet bar 1-a and the succeeding sheet bar 1-b are cut into concave form at the same curvature as shown in FIG. 34, a shape that the front and back end portions of the preceding and succeeding sheet bars 1-a, 1-b are concave at different curvatures as shown in FIG. 39, a shape that one of the bars is flat plane state and only the other is concave as shown in FIG. 40, a shape that one of the bars is convex and the other is concave and the curvature of the concave form is somewhat larger than the curvature of the convex form as shown in FIG. 41 and the like. In any case, the gap between the sheet bars at the central region in widthwise direction thereof is preferable to be not more than about 10 mm for removing the gap at the finish rolling stage. As a cutting means for obtaining the above shape, shear, gas cutting or laser cutting and the like may be used, and particularly the drum shear having two curved edges without taking a time for shape working is advantageously adaptable in case of cutting into concave form at a particular curvature.

As a heating means in the local butt joining between the sheet bars 1-a, 1-b at the entrance side of the finish rolling mill, heating with a burner, high frequency heating through coil of solenoid system, heating through transverse system and the like may be used.

In the hot finish rolling after the local joining between the sheet bars 1-a, 1-b, it is favorable that the joint portion between the preceding sheet bar 1-a and the succeeding sheet bar 1-b is rolled at a reduction ratio of not less than 20% at the above preferable gap for promoting the metal flow in the central region in widthwise direction of the sheet bar.

The preceding sheet bar and the succeeding sheet bar are previously joined at the entrance side of the finish rolling mill and the end portions of these sheet bars are contacted over a full region in the widthwise direction at the finish rolling stage to make the joint portion more rigid, so that there is caused no fear of breaking the joint portion in the rolling and the continuous hot rolling can be realized in a high productivity.

A further variation provides a rolling method which can simply and rapidly join the sheet bars to each other at the entrance side of the rolling mill and make the joining between the sheet bars more rigid with the advance of the finish rolling.

In FIG. 42 is shown a preferable construction of the apparatus used for carrying out the above, wherein numeral 24 is a profile measuring device for measuring a profile of the sheet bar at a delivery side of the rough rolling mill.

In the hot rolling of the sheet bar as shown in FIG. 43, the contact regions at a butted state between the back end of the preceding sheet bar 1-a and the front end of the succeeding sheet bar 1-b are first cut into at least both side regions in widthwise direction by means of the cutting device 5 provided with a curved edge or the like, and then compression stress is produced in the vicinity of both side regions between the preceding sheet bar 1-a and the succeeding sheet bar 1-b by a combination of the heating through the heating device 6 and the pushing through the adjustment of transferring rate of the sheet bars 1-a, 1-b to mutually close them to each other as shown in FIG. 44, which is fed into the finish rolling mill at such a state. When sufficient metal flow can be obtained under usual pressure by previously applying convex crown to the sheet bars 1-a, 1-b at the rough rolling stage as shown in FIG. 45, it is not necessary to conduct bending control of work roll in the finish rolling mill (however, when thickness at center of the sheet bar before the rolling is $H_o$, thickness at side edge portion of the sheet bar in widthwise direction before the rolling $h_o$, thickness at center of the sheet bar after the rolling is $H_1$, thickness at side edge portion of the sheet bar in widthwise direction after the rolling is $h_1$, the rolling is carried out at $(H_o-h_o)/H_o > (H_1-h_1)/H_1$, see FIG. 46 and FIG. 47). Moreover, even when the rolling is carried out so as to obtain the above convex crown or the uniform thickness in the widthwise direction of the sheet bar at the rough rolling stage, the concave crown is applied to the sheet bar by the bending control of work rolls or the like at the initial stage of the finish rolling to promote the metal flow at the central region in the widthwise direction and then the rolling is conducted for removing the gap formed in the joint portion of the sheet bars.

Since the butt joining between the preceding sheet bar 1-a and the succeeding sheet bar 1-b at the entrance side of the hot finish rolling mill is a local joining only in the vicinity of both side edge regions of the sheet bars in the widthwise direction as shown in FIG. 44, both the sheet bars are joined at a state having the gap g for a very short time. When the rolling as shown, for example, In FIG. 48 is conducted at such a state in the finish rolling mill, the gap between the front and back end portions of the sheet bars 1-a, 1-b is removed by the promotion of metal flow at the central region in the widthwise direction, whereby the end faces at the joint portion of the sheet bar are strongly joined over the full area in the widthwise direction as shown in FIG. 49, and consequently there is simply caused no breakage between the sheet bars even when the tension is applied to the rolled material for adjusting the size of the width at finish rolling.

In the change of crown ratio of the sheet bar, when the changing amount of crown ratio is represented by the following equation:

$$\Delta Cr/H = (H_o-h_o)/H_o - (H_1-h_1)/H_1 \times 100 \ (\%)$$

it is preferable that $\Delta Cr/H$ is within a range of 1.0–3.0%.

When the changing amount is less than 0.1%, the sufficient joining strength is not obtained, while when it exceeds 3.0%, the change of crown ratio is too large and the crown shape is disturbed.

Figure 50:
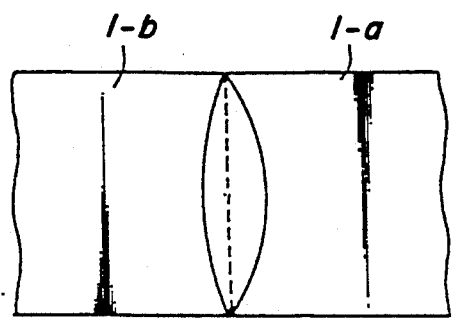
FIG. 50 is a schematic view illustrating a flat shape at joint portion of sheet bars.
Figure 51:
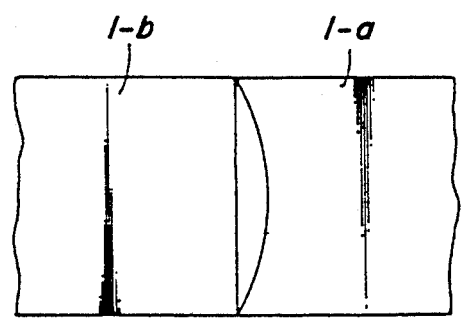
FIG. 51 is a schematic view illustrating a flat shape at joint portion of sheet bars.
Figure 52:
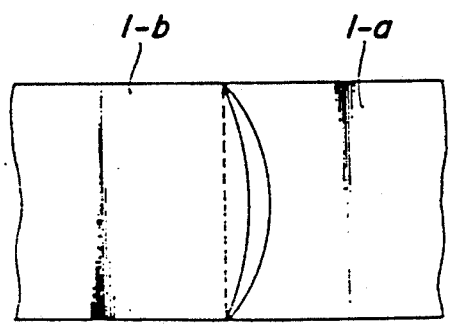
FIG. 52 is a schematic view illustrating a flat shape at joint portion of sheet bars.

As the cut shape at the end portion of the sheet bar, use may be made of various shapes such as shape that the end portions of the preceding sheet bar 1-a and the succeeding sheet bar 1-b are cut into concave form at the same curvature as shown in FIG. 43, a shape that the front and back end portions of the preceding and succeeding sheet bars 1-a, 1-b are concave at different curvatures as shown in FIG. 50, a shape that one of the bars is flat plane state and only the other is concave as shown in FIG. 51, a shape that one of the bars is convex and the other is concave and the curvature of the concave form is somewhat larger than the curvature of the convex form as shown in FIG. 52 and the like. In any case, the gap between the sheet bars st the central region in widthwise direction thereof is preferable to be not more than about 10 mm at a joined state after the heating and pushing for removing the gap at the finish rolling stage.

As a heating means in the local butt joining between the sheet bars 1-a, 1-b at the entrance side of the finish rolling mill, heating with a burner, high frequency heating through coil of solenoid system, heating through transverse system and the like may be used.

A convex crown is previously applied to the sheet bar at the rough rolling stage as shown in FIG. 46 and then the rolling as shown in FIG. 47 is conducted at the hot finish rolling after the local joining between the sheet bars 1-a, 1-b. Alternatively, it is considered that when the rolling is conducted at the rough rolling stage so as to obtain the convex crown or the uniform thickness in the widthwise direction, the concave crown is applied by the finish rolling mill $F_1$ or several-stage rolling mill inclusive of the above rolling mill. In any case, it is preferable that at least unjoined portion between the preceding sheet bar 1-a and the succeeding sheet bar 1-b is rolled at a reduction ratio of not less than 20% for effectively promoting metal low at the central region of the sheet bar in the widthwise direction to remove the gap.

As a means for changing the crown ratio, use may be made of work roll bender, a pair cross system in which pair of rolls are crossed with each other, a system of sliding taper piston, a variable crown system of mechanically changing the crown of the roll itself and the like.

Thus, the preceding sheet bar and the succeeding sheet bar are previously joined at the entrance side of the finish rolling mill and then the end portions of these sheet bars are contacted over a full area in the widthwise direction at the finish rolling stage to make the joint portion more rigid, so that there is caused no fear of breaking the joint portion in the rolling and the continuous hot rolling can be realized in a high productivity.

BEST MODE FOR CARRYING OUT THE INVENTION

Example 1

The joining of sheet bars was carried out in a transfer line at an entrance side of a finish rolling mill shown in FIG. 1 as follows.

A sheet bar of low carbon steel having a thickness of 30 mm and a width of 1000 mm was used as each of a preceding sheet bar 1-a and a succeeding sheet bar 1-b to be used in this experiment, and a drum shear having two curved edges was used as a cutting device 5.

Figure 53A:
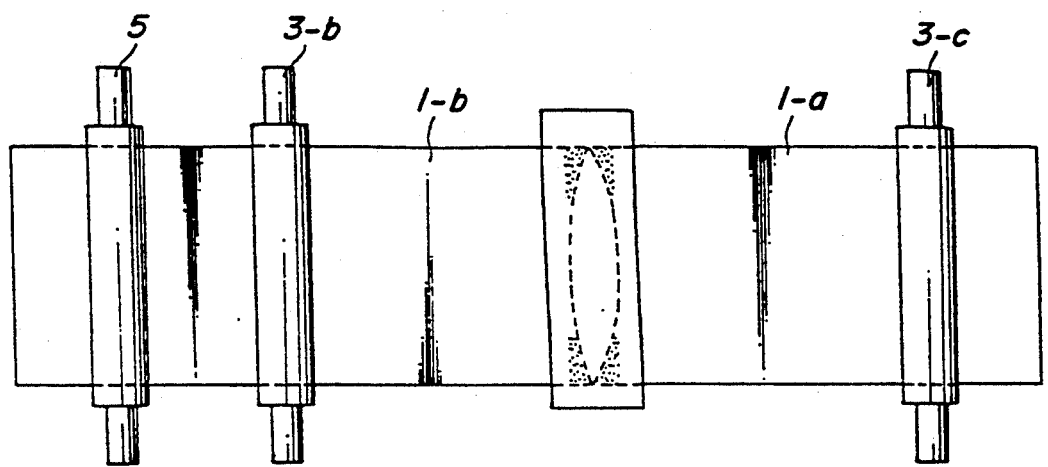
FIG. 53(a) and (b) are schematic views illustrating the cutting, heating and pushing of the sheet bar.
Figure 53B:
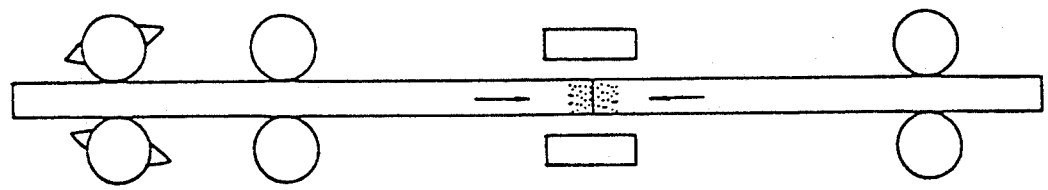

At first, the back end portion of the preceding sheet bar 1-a and the front end portion of the succeeding sheet bar 1-b were cut into an arc shape as shown in FIG. 53(a) by the drum shear 5. In this case, the radius of curvature in the cut face of each of sheet bar was 20m. Then, both side edge regions of the back end portion of the preceding sheet bar 1-a and the front end portion of the succeeding sheet bar 1-b were butted to each other at a contact state, and thereafter only both side edge regions were heated by a solenoid type induction coil (power applied: 4000 kW, frequency: 500 Hz). At a time that the heating temperature reached 1400+ C., the heating was stopped, and both sheet bars were pushed at a force of S kg/mm² through pinch rolls 3-b and 3-c as shown in FIG. 53(b). By such a pushing force, the joining margin was enlarged to w=200 mm.

In this case, the heating time for a portion to be joined was 10s, while that of the conventional technique heating the full area in the widthwise direction was 15s, so that the required heating time was largely shortened.

In the subsequent finish rolling, good continuously rolling was continued without separating the joint face.

Example 2

The back end portion of the preceding sheet bar 1-a and the front end portion of the succeeding sheet bar 1-b were butted at their both side edge regions to each other at a contact state in the same manner as in Example 1 and then subjected to a joining treatment as flows.
a. Alternating magnetic field (C-shaped magnetic poles)
   power applied: 2000 kW
   frequency: 500 Hz
b. Heating temperature: 1400° C.
C. Pushing force: 3 kgf/mm² as a contact pressure
d. Joining margin after heating and pushing W=200 mm (one-side 100 mm)
e. Joined state: pushing after the heating was stopped at a time reaching to 1400° C.

The time required for the completion of heating portions to be joined was 4s, so that it was largely shortened as compared with the case that the heating time of the conventional technique heating the full area in the widthwise direction was 15s. Furthermore, the consumption power was reduced to a half.

In the subsequent finish rolling, good continuously rolling was continued without separating the joint face.

Example 3

The back end portion of the preceding sheet bar 1-a and the front end portion of the succeeding sheet bar 1-b were butted at their both side edge regions to each other at a contact state in the same manner as in Example 1 and then subjected to a joining treatment as follows.
a. Alternating magnetic field (C-shaped magnetic pole)
   power applied: 2000 kW
   frequency: 500 Hz
b. Heating temperature: 1400° C.
c. Pushing force: 3 kgf/mm² as a contact pressure
d. Joining margin after heating and pushing W=200 mm (one-side 100 mm)
e. Joined state: heating after preliminary pushing In this case, the heating time required for the joining was 2.4s, so that the required heating time could be more shortened as compared with the conventional technique.

Although the above examples have been described with respect to the case that the induction heating system as used as a heating means, it has been confirmed that similar effect is obtained even in case of using another heating means such as gas burner or the like.

Example 4

The joining of sheet bars was conducted in a transfer line at an entrance side of a finish rolling mill shown in FIG. 1 by using a heating apparatus shown in FIG. 10 as follows.

A sheet bar of low carbon steel having a thickness of 30 mm and a width of 1000 mm was used as each of a preceding sheet bar and a succeeding sheet bar to be used in this experiment.

At first, the back end portion of the preceding sheet bar 1-a and the front end portion of the succeeding sheet bar 1-b were cut into the same shape as in Example 1 by the shear 5, and then both end portions were butted to each other at a contact state and heated to 1400° C. while controlling a power applied to alternating magnetic field generating coils 10, 11 (inductance of each coil: 1000 kW) so that the temperature difference between both end portions was within 110° C. while measuring temperatures of both end portions by means of radiation thermometers 12-a, 12-b. In this case, the heating time was 4 seconds. Then, both end portions were pushed at a force of contact pressure: 3 kg/mm² through pinch rolls 3-b and 3-c for 5 seconds.

The thus obtained joint face was perpendicular to the longitudinal direction of the sheet bar without obliquely inclining, and also there was no melt down at the joined end region.

Thereafter, the joint sheet bar was rolled to a thickness of 3 mm through 7 stand tandem mill, and consequently the good continuous rolling was continued without separating the joint face in the course of the rolling.

Example 5

When a treatment of heating while pushing was adopted as the heating and pushing treatment in Example 4, the time required for heating was shortened to 2.4 seconds.

Example 6

The experiment was carried out in the transfer line shown in FIG. 1 in the same manner as in Example 4 except that a drum shear having tow curved edges was used as a cutting device.

At first, the back end portion of the preceding sheet bar 1-a and the front end portion of the succeeding sheet bar 1-b were cut into arc shapes as shown in FIG. 2(a) by the drum shear 5, respectively. In this case, the radius of curvature of each of the cut faces was 20m. Then, both end portions were butted to each other at a contact state and heated to 1300° C. while controlling a power applied to alternating magnetic field generating coils 10, 11 (inductance of each coil: 1000 kW) so that the temperature difference between both end portions was within 110° C. while measuring temperatures of both end portions by means of radiation thermometers 12-a, 12-b. The heating time was 4 seconds. Thereafter, both end portions were pushed to each other at a force of contact pressure: 4 kg/mm² by the pinch rolls 3-b and 3-c for 5 seconds. By such a pushing force, the joining margin was enlarged to 0.2B.

The thus obtained joint face was perpendicular to the longitudinal direction of the sheet bar without obliquely inclining, and also there was no melt down at the joint end region.

Thereafter, the joint sheet bar was rolled to a thickness of 3 mm through 7 stand tandem mill, and consequently the good continuous rolling was continued without separating the joint face in the course of the rolling.

Example 7

When a treatment of heating while pushing was adopted as the heating and pushing treatment in Example 6, the time required for heating was shortened to 2.4 seconds.

Example 8

The sheet bars were joined in the transfer line at the entrance side of the finish rolling mill shown in FIG. 1 in the same manner as in Example 4 except that two oxygen rich burners for LPG were used as a heating apparatus.

At first, the back end portion of the preceding sheet bar 1-a and the front end portion of the succeeding sheet bar 1-b were cut into the same shapes as in Example 1 by the drum shear 5, respectively. Then, both end portions were butted to each other at a contact state and heated to 1400° C. while controlling LPG amount supplied to LPG burner through a control valve so that the temperature difference between both end portions was within 110° C. while measuring temperatures of both end portions by means of radiation thermometers 12-a, 12-b. The heating time was 20 seconds. Thereafter, both end portions were pushed to each other at a force of contact pressure: 3 kg/mm² by the pinch rolls 3-b and 3-c for 5 seconds.

The thus obtained joint face was perpendicular to the longitudinal direction of the sheet bar without obliquely inclining, and also there was no melt down at the joined end region.

Example 9

Figure 54:
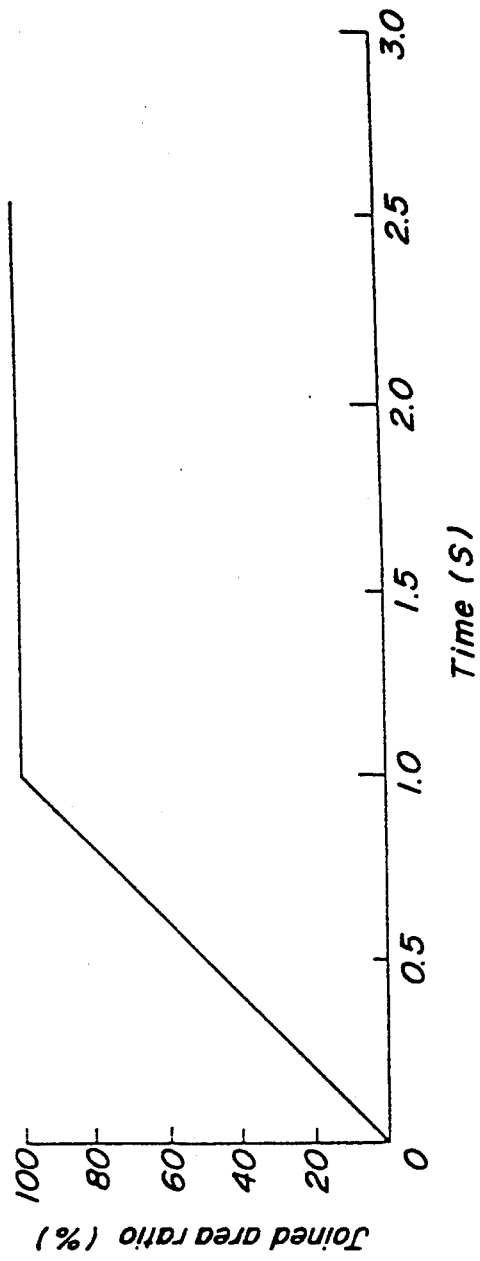
FIG. 54 is a graph showing a state of changing a joined area ratio.

When a sheet bar having a width of 1000 mm and a thickness of 30 mm (kind of steel: low carbon steel) was continuously hot rolled by using a rolling mill provided with 7 stand tandem rolling mill as shown in FIG. 14, the back end portion and the front end portion of the sheet bars were first cut into an arc shape having a radius of curvature o 20m at the entrance side of the hot rolling mill by the drum shear, respectively. Then, the back end portion of the preceding sheet bar and the front end portion of the succeeding sheet bar were butted to each other at both side edge regions at a contact state and subjected to a joining treatment under the following conditions:

a. alternating magnetic field (C-shaped magnetic pole) power applied: control within a range of 0–3500 kW (see FIG. 55)
   frequency: 500 Hz
b. target heating temperature: 1400° C. (initial temperature of sheet bar 1000° C.)
c. pushing force: 3 kgf/mm² (contact pressure)
d. joining margin (contact length): 100 mm one-side
e. joining state: heating was started with pushing and controlled so that the joining margin per one side at 1 second was 100 mm as shown in FIG. 54.

A comparison between a control pattern when conducting the joining treatment according to the invention and a control pattern when sheet bars having same flat shapes were joined at a constant power is shown in FIG. 55, and a comparison of temperature distribution at joint face between these patterns is shown in FIG. 56.

As seen from these figures, under the condition 1 that the heating and pushing treatment was carried out at a constant power applied (comparative example), the heating time at the end portion of the sheet bar becomes long, so that even if the initially set power is 2000 kW (about 60% of maximum power applied in condition 2), the temperature of the side edge region of the sheet bar reaches about 1450° C., while under the condition 2 according to the invention, the above tendency is effectively improved in the patterns A and B. Furthermore, the time required for the joining treatment was 2.4 second in the condition 1, and about 2.0 seconds in the condition 2, so that the time required for joining was shortened by about 17%.

Example 10

The joining of sheet bars was carried out in the transfer line at the entrance side of the finish rolling mill (7 tandem mill) shown in FIG. 19 as follows.

A sheet bar of low carbon steel having a thickness of 30 mm and a width of 1000 mm was used as each of a preceding sheet bar 1-a and a succeeding sheet bar 1-b to be used in this experiment. A drum shear having two curved edges was used as a cutting device (not shown).

At first, the back end portion of the preceding sheet bar 1-*a* and the front end portion of the succeeding sheet bar 1-*b* were cut into arc shapes having a radius of curvature of 20m by the drum shear, respectively. Then, the back end portion of the preceding sheet bar 1-*a* and the front end portion of the succeeding sheet bar 1-*b* were butted to each other at both side regions at a contact state and subjected to a joining treatment under the following conditions.

a. alternating magnetic field (C-shaped magnetic pole)
       power applied: 2000 kW
       frequency: 500 Hz
    b. heating temperature: 1400° C. (initial temperature: 1000° C.)
    c. contact length: 100 mm one-side
    d. joining state: heating was started with pushing
    e. time required for joining: 2.5 seconds (after the pushing, the heating was continued in a short time)

Figure 57A:
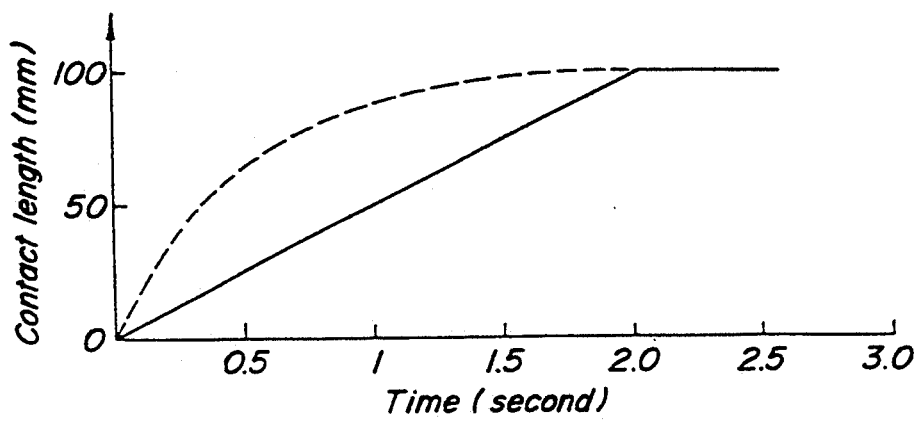
FIG. 57(a) is a graph showing a relation between pushing time and contact length when conducting pushing treatment according to the invention and the conventional technique.
Figure 57B:
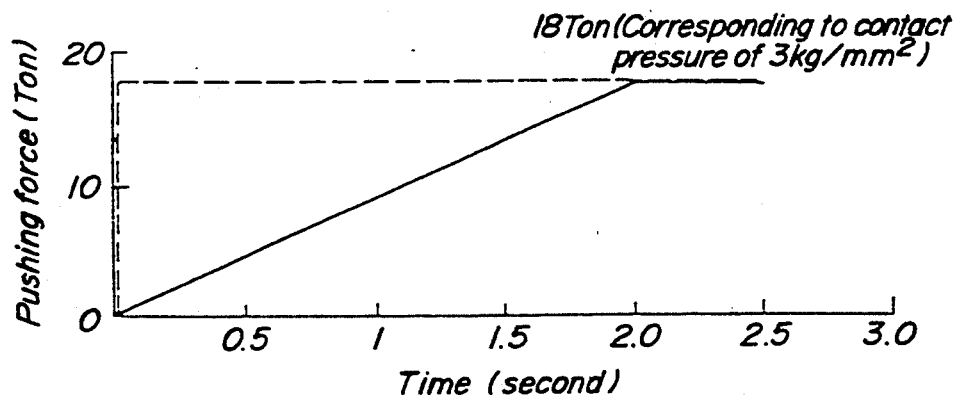
FIG. 57(b) is a graph showing a relation between pushing time and pushing force when conducting pushing treatment according to the invention and the conventional technique.

As regard the pushing, there were two cases, i.e. a case (pushing I) that the joining of 100 mm per one-side was conducted in 2 seconds when the changing rate of contact length was constant at 50 mm/s according to the invention as shown by solid lines in FIGS. 57(*a*) and (*b*), and a case (pushing II, required time: about 1 second) that the joining was conducted at a constant pushing force of 3 kgf/mm$^2$ corresponding to a final pushing force according to the conventional technique as shown by dotted lines in the same figures.

Figure 58:
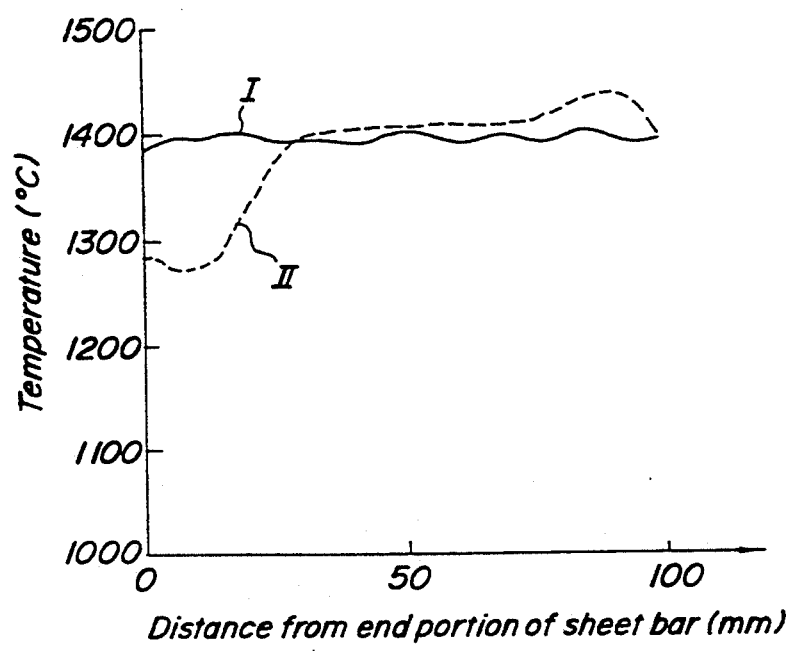
FIG. 58 is a graph showing a temperature distribution at joint face when conducting pushing treatment according to the invention and the conventional technique.

A comparison of temperature distribution at joint face between both the above cases is shown in FIG. 58.

As seen from this figure, in the conventional technique, a large current does not flow at the initial joining stage, so that the temperature is low in a region from end face to 30 mm, while a time flowing a large current is long at last joining stage in a region from the end face to 80-100 mm and the temperature becomes high, so that the adequate joining temperature range of 1250°-1450° C. over the joining region is satisfied, but the temperature distribution is ununiform.

On the contrary, when the changing rate of contact length is constant at 50 mm/s according to the invention, the uniform temperature distribution over the full joining region is obtained and the good joined state is obtained.

Example 11

Low carbon steel sheet bars having a width of 1000 mm and a thickness of 20 mm, 40 mm and 60 mm were joined by using the apparatus shown in FIG. 21 under the following conditions:

Heating condition: adjustment of power applied so that the portions to be joined reached 1400° C. for 3 minutes. In case of the sheet bar having thickness of 20 mm, the frequency of a current applied to the induction heating coil was changed into 2500 Hz, 6000 Ha and 250 Hz, and in case of the sheet bar having a thickness of 40 mm, it was changed into 600 Hz, 1600 Hz and 50 Hz, and in case of the sheet bar having a thickness of 60 mm, it was changed into 300 Hz, 700 Hz and 50 Hz.

Pushing condition: pushed at a contact pressure of 3 kg/mm$^2$ for 3 seconds with heating, and then subjected to finish rolling, whereby a hot rolled sheet of 3 mm in thickness was obtained, during which a state of causing breakage in the rolling was examined.

As a result, when the heating and joining were carried out according to the invention, there was caused no breakage of the joint portion in the rolling and the joining strength of the joint portion measured after the rolling was equal to that of the matrix. On the contrary, when the frequency of the current applied to the heating coil is not proper, the joint portion was broken in the rolling and consequently the rolling could not be continued.

Example 12

By using the apparatus provided with 7 stand tandem rolling mill as shown in FIG. 22, a succeeding sheet bar having a width of 1000 mm and a thickness of 40 mm and a preceding sheet bar having a thickness of 35 mm were worked at their end portions into flat shapes as shown in FIG. 59. Such an end-worked low carbon steel sheet bar (l: 3000 mm, t: 28 mm, subjected to thinning treatment by adjusting a roll distance in rough rolling) was joined under the following conditions and then continuously fed to a rolling mill to obtain a hot rolled sheet of 3 mm in thickness.

a. alternating magnetic filed:
       power applied: 2000 kW
       heating time: 14 seconds
       frequency: 500 Hz
    b. heating temperature: 1420° C. (joint end face)
    c. pushing force:
       2 kgf/mm$^2$ as a contact pressure
       pressurizing time: 5 seconds
    d. joining state: heating with pushing As a result, the rolling could stably be conducted without breaking the joint portion between the sheet bars in the rolling. Furthermore, it has been confirmed that the power consumption can be reduced to about 40% and the joining time can be shortened to about 5 seconds as compared with the conventional joining of high frequency heating system using the same sheet bar (provided that the front and back end portions of the sheet bars are not subjected to thinning treatment) under the same conditions as described above.

Moreover, the joining states foe several sheet bars having different thicknesses as shown in FIG. 23 were examined. Even in these cases, there was caused no breakage of the joint portion by rolling and no breakage and separation of joint portion produced in case of not subjecting the front and back end portions of the sheet bars to thinning treatment was observed. Further, off gauge ratio could be reduced to about 90% as compared with the case of not subjecting to thinning treatment.

Moreover, states of changing a thickness in longitudinal direction of a product (thickness 3.0 mm, width 1000 mm) when being joined and rolled according to the invention and when being joined and rolled according to the conventional technique are shown in FIGS. 60(*a*) and (*b*). According to the invention, it has been confirmed that the followability of AGC is improved, so that the deviation of thickness in the thinned portion is improved from 300 μm to 35 μm and is substantially equal to that of the non-thinned portion.

Example 13

The joining of sheet bars was carried out by using the joining apparatus shown in FIG. 1 as follows.

A sheet bar of low carbon steel having a thickness of 30 mm and a width of 1000 mm was used as each of a preceding sheet bar 1-*a* and a succeeding sheet bar 1-*b* to be used in this experiment.

At first, the back end portion of the preceding sheet bar 1-*a* and the front end portion of the succeeding sheet bar 1-*b* were cut by the drum shear 5 and butted to each other, and then the heating was started through a solenoid type induction coil shown in FIG. 8. In this case, the heating conditions were as follows and the heating time was presumed according to the system shown in FIG. 26.
- power applied: 2000 kW
- target temperature $\theta_F$: 1300° C.
- first time for temperature measurement: $t_1$: 0.5s
- second time for temperature measurement: $t_2$: 1s At this time,
- initial temperature $\theta_1$: 1000° C.
- temperature of sheet bar after a $t_1$ time $\theta_2$: 1040° C.
- temperature of sheet bar after a $t_2$ time $\theta_3$: 1120° C.

Therefore, A and B were A=26.2 and B=−1020 from the equations (2) and (3), respectively, and t was t=2.2 from the equation (1).

Moreover, a time lag inherent to the control system was $t_L$: 0.5s $$(t-t_L)=1.7s$$

Therefore, a current flow was cut after 1.7s from a time of the second temperature measurement.

As a result, the temperature of the sheet bar after the time t was 1290° C., so that the heating to approximately target temperature could be attained.

Example 14

The joining of sheet bars was conducted in the transfer line at the entrance side of the finish rolling mill (7 tandem mill) shown in FIG. 1 as follows.

A sheet bar of low carbon steel having a thickness of 30 mm and a width of 1000 mm was used as each of a preceding sheet bar and a succeeding sheet bar to be used in this experiment, and a drum shear having two curved edges as a cutting device.

At first, the back end portion of the preceding sheet bar and the front end portion of the succeeding sheet bar were cut into arc shapes having a radius of curvature of 20m by the drum shear. Then, the back end portion of the preceding sheet bar and the front end portion of the succeeding sheet bar were butted to each other at their both side edge regions at a contact state and thereafter subjected to a preliminary joining treatment under the following conditions.

a. alternating magnetic field (C-shaped magnetic pole)
   - power applied: 2000 kW
   - frequency: 500 Hz
b. heating temperature: 1400° C. (initial temperature: 1000° C.)
c. prejoining length: 100 mm one-side
d. prejoining state: start heating with pushing
e. gap quantity at central region after the completion of preliminary joining: 4, 12 mm
f. constant k of equation (6)=0.25.

After both side regions were preliminary joined under the above conditions, when the rolling was conducted at a reduction ratio of 40% in a first pass of finish rolling, if the gap quantity was 4 mm, the complete joining could be attained, while if the gap quantity was 12 mm, the complete joining could not be attained and the unjoined portion remained.

Moreover, the relation of the above equation (6) when the reduction ratio was as follows:

$$G \leq 30 \times (1-0.40) \times (1.25 \times 0.40 - 0.25) = 4.5$$

Example 15

When the sheet bars having a width of 1000 mm and a thickness of 30 mm (steel kind: low carbon steel) was continuously hot rolled by using the rolling equipment provided with 7 stand tandem rolling mill as shown in FIG. 33, the vicinity of widthwise edge regions at the back end portion and the front end portion of the sheet bars was subjected to a thinning treatment under conditions of t/T=0.6 and 0.95 at the entrance side of the cutting device 5, and also each end portion was cut into a flat shape as shown in FIG. 39, and thereafter these sheet bars were subjected to heating, pushing and finish rolling under the following conditions to obtain a hot rolled sheet of 3 mm in thickness.

a) heating system: heating of transverse system by application of alternating magnetic fields
b) heating temperature: 1400° C.
c) heating time: 2.4 seconds
d) pushing force: 3 kg/mm² as a contact pressure
e) power applied: 2000 kW
f) joining state: heating with pushing gap g: 10 mm
g) joining margin: 100 mm one-side×2

As a result, it has been confirmed that the stable rolling is attained at both conditions without the causing breakage of joint portion between the sheet bars in the rolling.

On the contrary, when the sheet bars were joined and rolled under the same conditions without subjecting the front end portion and back end portion of the sheet bars, the complete rolling could not be attained and the unjoined portion remained and the breakage was frequently caused in the rolling. Furthermore, when the rolling was conducted under the same conditions without subjecting the widthwise edge regions at the front end portion and back end portion of the sheet bas to the thinning treatment and to cutting work for formation of joint region, the joining time for surely joining the sheet bars to each other at such regions took not less than 20 seconds, and hence it was required to increase the capacity of the heating apparatus or prolong the line at the region, so that it was very disadvantageous for carrying out the continuous hot rolling of the sheet bar.

Example 16

When the sheet bar having a width of 1000 mm and a thickness of 30 mm (steel kind: low carbon steel) was continuously hot rolled by using the rolling equipment provided with 7 stand tandem rolling mill as shown in FIG. 42, the back end portion and the front end portion of the sheet bars were cut into a flat shape as shown in FIG. 43 at the entrance side of the hot rolling mill, and thereafter these sheet bars were subjected to heating, pushing and finish rolling under the following conditions to obtain a hot rolled sheet of 3 mm in thickness.

a) heating system: heating of transverse system by application of alternating magnetic fields
b) heating temperature: 1400° C.
c) heating time: 2.4 seconds
d) pushing force: 3 kg/mm²
e) power applied: 2000 kW
f) joining state: heating with pushing gap g: 10 mm
g) joining margin: 100 mm one-side×2
h) rolling at rolling mill $F_1$: crown ratio was reduced so as to be crown ratio at entrance side 30 mm=29.2 mm/30 mm=±0.027 (convex crown) and crown ratio at delivery side 18 mm−18.0 mm/18.0 mm=0

As a result, it has been confirmed that the stable rolling is attained without causing the breakage of joint portion between the sheet bars in the rolling.

On the contrary, when the rolling was conducted under the same conditions without subjecting the front end portion and the back end portion of the sheet bars to cutting work for rendering the widthwise edge regions into joint portions and changing the crown ratio, the joining was insufficient at the initial stage of the finish rolling and the breakage of joint portion was caused in rolling.

Further, when the sheet bar having a width of 1000 mm and a thickness of 30 mm (steel kind: low carbon steel) was continuously hot rolled by using the same rolling equipment provided with 7 stand tandem rolling mill, the back end portion and the front end portion of the sheet bars were cut into a flat shape as shown in FIG. 43 at the entrance side of the hot rolling mill, and thereafter these sheet bars were subjected to heating, pushing and finish rolling under the following conditions to obtain a hot rolled sheet of 3 mm in thickness.

a) heating system: heating of transverse system application of alternating magnetic fields
b) heating temperature: 1400° C.
c) heating time: 3 seconds
d) pushing force: 3 kg/mm$^2$
e) pressurizing time: 3 seconds
f) joining state: heating with pushing gap g: 10 mm
g) joining margin: 100 mm one-side×2
h) rolling at rolling mill F$_1$: crown ratio was reduced so as to be crown ratio at entrance side 30 mm−30 mm/30 mm=0 and crown ratio at delivery side 17.8 mm−18.0 mm/17.8 mm=−0.011.

As a result, it has been confirmed that the stable rolling is attained without causing the breakage of joint portion between the sheet bars even in the rolling.

We claim:

1. A method of joining steel members such as sheet bars and slabs in hot rolling by butting a back end portion of a preceding sheet bar to a front end portion of a succeeding sheet bar at an entrance side of a hot finish rolling mill and then heating and joining, characterized in that each of the back end portions of the preceding member and the front end of the succeeding member is cut into a shape that at least portions of both side edge regions of these members are contacted with each other at a butted contact state of the members so as to have a gap between the butted faces of the members; and that portions of the preceding and succeeding members to be joined are locally heated and pushed to gradually increase a joining area, wherein at least two heating means are arranged along a butted contact region in the heating treatment and each of the heating means is individually controlled to restrain a difference of temperature at each of the heating zones to not higher than 110° C.

2. The method for joining steel members in hot rolling according to claim 1, wherein at least two heating means are arranged along a butted contact region in the heating treatment and each of the heating means is individually controlled to restrain a difference of temperature at each of the heating zones to not higher than 110° C.

3. The method of joining steel members in hot rolling according to claim 1, wherein when the butted contact region is heated with an induction heating coil of a transverse system or solenoid system, a current of a frequency determined according to the following equation is passed through the induction heating coil:

$$f = k/d^2$$

f: frequency [Hz]
k: constant $(2 \times 10^5 - 2 \times 10^6)$
d: thickness of member.

4. The method of joining steel members in hot rolling according to claim 1, wherein when the butted contact region is heated to a target temperature with an induction heating coil of a transverse system or solenoid system, a temperature rising curve to the target temperature is predicted from an initial temperature of the steel member, and a temperature rising rate and a time required for attaining the target temperature is calculated therefrom adding a time lag due to delaying of a control system, and then the heating treatment is carried out based on the calculated value.

5. The method of joining steel members in hot rolling according to claim 1, when the butted contact region is heated with an induction heating coil of a transverse system, a power applied to the induction heating coil is increased in accordance with the enlargement of the joining area in each member accompanied with the heating and pushing.

6. The method of joining steel members in hot rolling according to claim 1, wherein the butted contact region is heated through an electric heating roll, a power applied to the electric heating roll is increased in accordance with the increase of the joining area in each member accompanied with the heating and pushing.

7. The method of joining steel members in hot rolling according to claim 1, wherein a joint portion between the preceding member and the succeeding member is heated through an induction heating coil of transverse system and simultaneously subjected to a pushing force satisfying a rate of joining length change of 15-130 mm/s at a joint region in a widthwise direction of the member.

8. The method of joining steel members in hot rolling according to claim 7, wherein the rate of joining length change is constant within a range of 15-130 mm/s.

9. The method of joining steel members in hot rolling according to claim 1, wherein when the butted contact region is heated with an induction heating coil of a transverse system or solenoid system, a current of a frequency determined according to the following equation is passed through the induction heating coil:

$$f \times k/d^2$$

f: frequency(Hz)
k: constant $(2 \times 10^5 - 2 \times 10^6)$
d: thickness of steel member (mm)

10. The method of joining steel members in hot rolling according to claim 1, wherein either one or both of butted portions of the members is subjected to a thinning treatment for equalizing thicknesses of both portions at a hot rough rolling stage or a prestage of the heating treatment.

11. The method of joining steel members in hot rolling according to claim 1, wherein when the butted contact region is heated to a target temperature with an induction heating coil of a transverse system or solenoid system, a temperature rising curve to the target temperature is predicted from an initial temperature of the member and a temperature rising rate and a time required for attaining the target temperature is calculated therefrom adding a time lag due to delaying of a control system, and then the heating treatment is carried out based on the calculated value.

12. A method of continuously hot rolling steel members such as sheet bars and slabs by continuously feeding a preceding member through a rough rolling step and a succeeding member to be transferred to the preceding member into a finish rolling mill, characterized in that a back end portion of the preceding member and a front end portion of the succeeding member are subjected to a cutting operation at an entrance side of a finish rolling mill so as to render a butted contact region between the end portions into at least portions of both side edge regions in a widthwise direction of the member, and then each of the members is subjected to heating and pushing treatments to join the edges and further subjected to a finish rolling, wherein at least a part of the butted region including both widthwise side edge regions of each of the members is preliminarily joined at a gap between the butted regions and a gap G in a longitudinal direction between joined regions in the preliminary joining satisfies a relationship represented by the following equation:

$$G \leq H \times (1-r) \times \{(1+k) \times r - k\}$$

H: thickness of sheet bar at the entrance side of finish rolling mill, r: accumulated reduction ratio at height of finish rolling, k: constant determined in accordance with rolling conditions.

13. The method of continuously hot rolling steel members according to claim 12, wherein the H is 20–50 mm, and the accumulated reduction ratio at the height of finish rolling r is 0.20–0.60 and the constant k is 0.15–0.35.

14. The method of continuously hot rolling steel members according to claim 12, wherein at least both side edge regions are subjected along an elongated axis of the member to a thinning treatment prior to the cutting operation.

15. The method of continuously hot rolling steel members according to claim 12, wherein the steel member is rolled so as to reduce a crown ratio thereof at an initial stage of finish rolling.

16. The method of continuously hot rolling steel members according to claim 15, wherein a convex crown is previously applied to the steel member during a rough rolling stage and then usual rolling is carried out at the initial stage of finish rolling to reduce the crown ratio of the member.

17. The method of continuously hot rolling steel members according to claim 15, wherein the rolling for reducing the crown ratio of the steel member is carried out at the initial stage of finish rolling so as to apply a concave crown.

* * * * *